US009289684B2

(12) United States Patent
Knutsson

(10) Patent No.: US 9,289,684 B2
(45) Date of Patent: Mar. 22, 2016

(54) METHOD FOR IMPLEMENTING A COMPUTER GAME

(71) Applicant: King.com Limited, St. Julians (MT)

(72) Inventor: Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 324 days.

(21) Appl. No.: 14/029,232

(22) Filed: Sep. 17, 2013

(65) Prior Publication Data
US 2014/0080558 A1 Mar. 20, 2014

Related U.S. Application Data

(60) Provisional application No. 61/701,907, filed on Sep. 17, 2012, provisional application No. 61/811,019, filed on Apr. 11, 2013, provisional application No. 61/818,702, filed on May 2, 2013, provisional (Continued)

(30) Foreign Application Priority Data

| Feb. 6, 2013 | (GB) | 1302121.7 |
| Feb. 19, 2013 | (GB) | 1302910.3 |
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
A63F 13/00 (2014.01)
A63F 13/40 (2014.01)
(Continued)

(52) U.S. Cl.
CPC .............. *A63F 13/10* (2013.01); *A63B 71/06* (2013.01); *A63F 13/00* (2013.01); *A63F 13/005* (2013.01); *A63F 13/12* (2013.01); *G06F 9/44* (2013.01); *G07F 17/32* (2013.01); *G07F 17/3274* (2013.01)

(58) Field of Classification Search
CPC ......... A63F 13/00; A63F 13/34; A63F 13/46; A63F 13/49
USPC .................................. 463/10, 16, 42
See application file for complete search history.

(56) References Cited

U.S. PATENT DOCUMENTS 5,488,496 A 1/1996 Pine
6,068,552 A 5/2000 Walker et al.
(Continued)

FOREIGN PATENT DOCUMENTS

DE 10304725 A1 9/2004
EP 1564698 A2 8/2005
(Continued)

OTHER PUBLICATIONS

Dig Dug Video Game (by Namco, 1982).*
(Continued)

Primary Examiner — James S McClellan
(74) Attorney, Agent, or Firm — Saul Ewing LLP

(57) ABSTRACT

A method, implemented as computer code being executed by one or more processors, in which a computing device displays computer game graphics showing a gameboard with multiple game elements that disappear when matched or switched, such as in a match-3, clicker or switcher game; and in which one or more of the processors are programmed such that: the gameboard includes an entry point and one or more exit points and the player completes a level of the game if he or she clears elements to make a path from the entry point to an exit point; and the game includes a virtual path though which the player progresses if he or she completes a level of the game; and that virtual path can, at some nodes, fork in several different directions and the position of the exit successfully reached in the gameboard determines which fork the player will take through the virtual path if the player completes a level.

31 Claims, 24 Drawing Sheets

Related U.S. Application Data application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(51) Int. Cl.
| | | |
|---|---|---|
| G07F 17/32 | (2006.01) | |
| A63B 71/06 | (2006.01) | |
| A63F 13/30 | (2014.01) | |
| G06F 9/44 | (2006.01) | |

(56) References Cited

U.S. PATENT DOCUMENTS

| | | | |
|---|---|---|---|
| 6,117,013 A | 9/2000 | Eiba | |
| 7,073,792 B2 | 7/2006 | Esposito et al. | |
| 7,749,060 B1 | 7/2010 | Olmes, III et al. | |
| 8,002,633 B2 | 8/2011 | Shimizu et al. | |
| 8,088,010 B1 | 1/2012 | Hill et al. | |
| 8,237,743 B2 | 8/2012 | Csurka et al. | |
| 8,277,320 B1 | 10/2012 | Hart et al. | |
| 8,369,873 B2 | 2/2013 | Krasner et al. | |
| 8,526,490 B2 | 9/2013 | Buckley et al. | |
| 8,672,744 B1 | 3/2014 | Steere et al. | |
| 8,711,923 B2 | 4/2014 | Buckley et al. | |
| 8,727,893 B2 | 5/2014 | Otremba et al. | |
| 8,784,181 B2 * | 7/2014 | Caputo et al. | G07F 17/32 273/248 |
| 8,964,830 B2 | 2/2015 | Perlman et al. | |
| 9,033,803 B1 | 5/2015 | Etter et al. | |
| 2002/0082068 A1 | 6/2002 | Singhal | |
| 2002/0094870 A1 | 7/2002 | Murray et al. | |
| 2003/0049592 A1 | 3/2003 | Park et al. | |
| 2003/0074416 A1 | 4/2003 | Bates et al. | |
| 2003/0119581 A1 | 6/2003 | Cannon et al. | |
| 2004/0053688 A1 | 3/2004 | Hosaka et al. | |
| 2004/0224772 A1 | 11/2004 | Canessa et al. | |
| 2005/0256985 A1 | 11/2005 | Shea et al. | |
| 2006/0068876 A1 | 3/2006 | Kane et al. | |
| 2006/0160620 A1 | 7/2006 | Matthews et al. | |
| 2006/0223635 A1 | 10/2006 | Rosenberg | |
| 2006/0277474 A1 | 12/2006 | Robarts et al. | |
| 2006/0281541 A1 | 12/2006 | Nguyen et al. | |
| 2006/0287098 A1 | 12/2006 | Morrow et al. | |
| 2007/0259709 A1 | 11/2007 | Kelly et al. | |
| 2008/0005353 A1 | 1/2008 | Panabaker et al. | |
| 2009/0170608 A1 | 7/2009 | Herrmann et al. | |
| 2009/0203415 A1 | 8/2009 | Falciglia et al. | |
| 2010/0144426 A1 | 6/2010 | Winner et al. | |
| 2010/0151934 A1 | 6/2010 | Kniberg et al. | |
| 2010/0218135 A1 | 8/2010 | Brugler et al. | |
| 2010/0227675 A1 | 9/2010 | Luxton et al. | |
| 2010/0271367 A1 | 10/2010 | Vaden et al. | |
| 2010/0317437 A1 | 12/2010 | Berry et al. | |
| 2011/0053681 A1 | 3/2011 | Goldman et al. | |
| 2011/0111835 A1 | 5/2011 | Cohen et al. | |
| 2011/0136561 A1 | 6/2011 | Acres et al. | |
| 2011/0136572 A1 | 6/2011 | Karn et al. | |
| 2011/0269532 A1 | 11/2011 | Shuster et al. | |
| 2012/0030094 A1 | 2/2012 | Khalil et al. | |
| 2012/0040752 A1 | 2/2012 | Koo et al. | |
| 2012/0077580 A1 | 3/2012 | Mahajan et al. | |
| 2012/0122552 A1 | 5/2012 | Youm et al. | |
| 2012/0191606 A1 | 7/2012 | Milne et al. | |
| 2012/0198417 A1 | 8/2012 | Haviv et al. | |
| 2013/0035164 A1 | 2/2013 | Osvald et al. | |
| 2013/0172061 A1 | 7/2013 | Iosilevsky et al. | |
| 2013/0267285 A1 | 10/2013 | Kelley et al. | |
| 2013/0316832 A1 | 11/2013 | Olofsson et al. | |
| 2013/0323697 A1 | 12/2013 | Shadduck et al. | |
| 2013/0331162 A1 | 12/2013 | Krivicich et al. | |
| 2014/0024450 A1 | 1/2014 | Ramachandran et al. | |
| 2014/0080600 A1 | 3/2014 | Knutsson et al. | |
| 2014/0235338 A1 | 8/2014 | Hansson et al. | |
| 2014/0252987 A1 | 9/2014 | Hinrichs et al. | |
| 2014/0342791 A1 | 11/2014 | Hugh et al. | |
| 2014/0357367 A1 | 12/2014 | Lee | |
| 2014/0370950 A1 | 12/2014 | Hansson et al. | |
| 2015/0050997 A1 | 2/2015 | Suzman et al. | |
| 2015/0174489 A1 | 6/2015 | Evald et al. | |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| WO | WO01/46790 A2 | 6/2001 |
| WO | 2006/052212 A1 | 5/2006 |
| WO | 2007/078533 A2 | 7/2007 |
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | 2010/083346 A1 | 7/2010 |
| WO | WO 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO2013/174933 | 11/2013 |

OTHER PUBLICATIONS

Bejeweled Video Game (by PopCap, 2001).*
Bejeweled article from Wikipedia, printed Sep. 30, 2015.*
Dig Dug article form Wikipedia, printed Sep. 30, 2015.*
Anonymous, "Amazon Survival YouTube video, Uploaded to YouTube on Mar. 13, 2009, video length 6:06", https://www.youtube.com/watch?v=8S2gM5POUUk, Mar. 13, 2009, 1.
Anonymous, "Bejeweled 2 Wikipedia Article", Sep. 30, 2015, 1-3.
Anonymous, "Best iOS/Android cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.
Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.
Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.
Anonymous, "Candy Crush Saga Facebook Game levels 1-10 video on YouTube, YouTube screen shorts figures 1-7", https://www.youtube.com/watch?v=8TleNDnJiN8, Apr. 15, 2012.
Anonymous, "Candy Crush Saga for Facebook, YouTube video demonstrating levels 1-10, video length 15:23", https://www.youtube.com/watch?v=cfqHVkWX5yE, Apr. 12, 2012, 1 page.
Anonymous, "Candy Crush Saga on Facebook Review on YouTube video, Screen shots of YouTube video, figures 1-13", https://www.youtube.com/watch?v=AbH8Givg6XM, Sep. 7, 2012.
Anonymous, "Cross-platform", retrieved from the Internet: URL:http://en.widipedia.org/w/index.php?title=Cross-platform &oldid=487867404 [retrieved on Jul. 1, 2013] XP055068984, Apr. 17, 2012, pp. 1-16.
Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Facebook Spiel Candy Crush Saga: Cheats, Tipps, News und Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.

(56) References Cited

OTHER PUBLICATIONS

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.widipedia.org/w/index/php?title=Model%E2%80%93view%E2%80%93controller&oldid=511810952 'retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.

Collins, "Will Collins Game Spotlight: Candy Crush Saga", retrieved from the Internet: URL:https//developers.facebook.com/blog/post/2012/06/15/game-spotlight--candy-crush-saga/ [retrieved on Oct. 25, 2013] XP055085345, Jun. 15, 2012, pp. 1-2.

Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.

Josef, "Bloxley Tutorial #1—Sokoban", http://bloxley.net/2010/10/tutorial-1-sokoban, Oct. 13, 2010.

Murphy, "Bejeweled 2 Strategy Guide", www.bigfishgames.com, Aug. 15, 2010.

Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015] XP054975821, Apr. 15, 2012.

Schoenau-Fog, "The Player Engagement Process—An Exploration of Continuation Desire in Digital Games", http://www.digra.org/wp--content/uploads/digital-library/11307.06025.pdf, 2011.

Squires, "Bubble Witch Saga is going mobile—Gamezebo", retrieved from the Internet: URL:http://www.gamezebo.com/news/2012/06127/bubble-witch-saga-going-mobile [retrieved on Dec. 9, 2013] XP055092339, Jun. 27, 2012, pp. 1-2.

\* cited by examiner

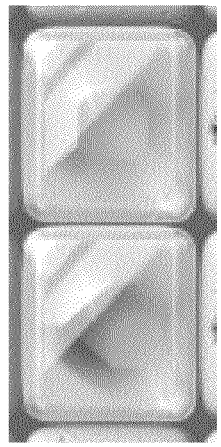
Figure 17
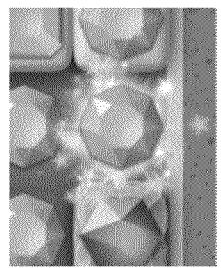
Figure 18
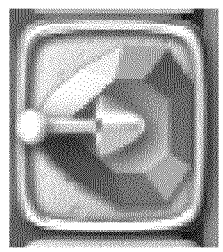
Figure 16
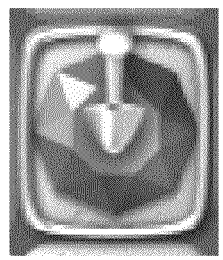
Figure 16
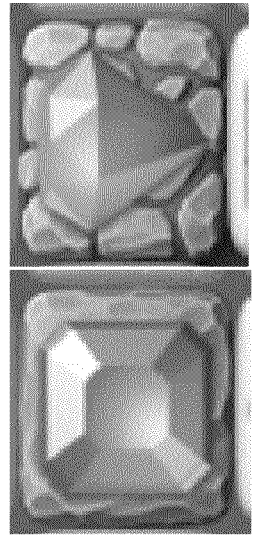
Figure 20
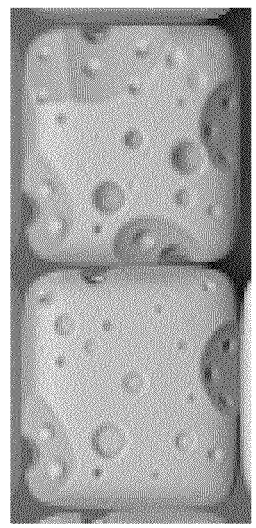
Figure 19
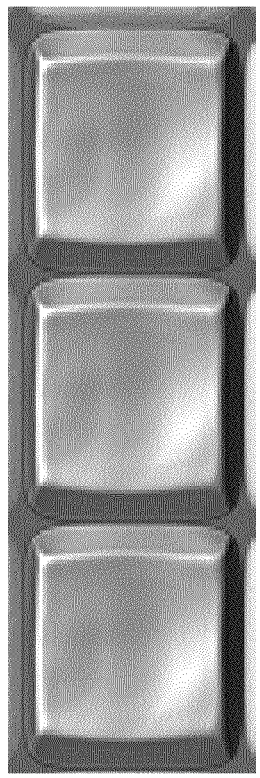
Figure 22
Figure 21

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

1. Field of the Invention

The invention relates to casual social games.

2. Technical Background

There are multiple technical challenges facing the designer of computer-implemented games and in creating a fun and compelling game. Three of these challenges can be broadly categorised into the following areas: 'Engagement'; 'viralisation' and 'monetisation'.

We will look first at 'engagement', which involves designing gameplay to be engaging and rewarding to players. This typically requires games to be easily understood at their simplest or introductory levels; providing rewarding gameplay, with quite simple game mechanics, but becoming progressively more challenging so that players are not bored, but remain engaged and develop rewarding skills. Effective engagement requires various forms of feedback to reinforce the player's sense of success and accomplishment. Effective engagement can be greatly magnified if the game has a social aspect—for example if it is linked to a social network so that game players can interact with their friends in the social network. The game can then transform into something that goes far beyond a solo game experience and become more like a shared journey.

'Viralisation' requires a game to include various techniques that encourage players to share the game with others; encouraging them to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game: This involves many challenges, because the monetisation techniques need to be acceptable to players and in no way undermine engagement.

A successful and original game will require a team of game designers to solve complex problems of engagement, viralisation and monetisation: This can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed fro the game board. In a typical shooter game the physics of the game board being that the game pieces are falling downwards on the board.

There are also other types of games where groups of certain game elements are combined together and removed when they have reached a certain size. The user can connect the groups with a swiping movement touching each of the connecting elements in one implementation and in another implementation the groups are formed to one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

3. Discussion of Related Art

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which a computing device displays computer game graphics showing a gameboard with multiple game elements that disappear when matched or switched, such as in a match-3, clicker or switcher game; and in which one or more of the processors are programmed such that:

the gameboard includes an entry point and one or more exit points and the player completes a level of the game if he or she clears elements to make a path from the entry point to an exit point;

and the game includes a virtual path though which the player progresses if he or she completes a level of the game;

and that virtual path can, at some nodes, fork in several different directions and the position of the exit successfully reached in the gameboard determines which fork the player will take through the virtual path if the player completes a level.

Any one or more of the following optional features may be included, resulting in a method:

in which the processor shows the virtual path is through underground tunnels and rooms in which the processor shows the animated figure digging though the underground tunnels to reach new rooms in which the processor shows the gameboard, if a path is cleared of elements to an exit, with water flowing from the entry position to the exit in which the processor shows the gameboard elements are diamonds, jewels or candies in which the processor is programmed so that each level has to be cleared in a defined number of moves, but is not timed in which the processor is programmed so that each gameboard has between 1 and 3 exits in which some or all game levels are untimed, eliminating any time pressure in which the game is a casual, social game and some or all levels have a true fail, to enable monetization through purchasing extra moves in which there is a continuous musical soundtrack plays during gameplay in which the game generates and displays congratulatory messages when the player scores more than a predefined amount, or matches more than a predefined number of game elements, in a single move in which there is an algorithm for automatically detecting when there are no possible moves left in which there is an algorithm for re-shuffling the elements on the game board in which a processor generates, if no move has been made for a while, help or hints by brightening and enlarging game elements used in a possible move on the board with a flashing animation in which a processor is programmed to require a player to reach a target score before running out of moves in order to complete a level successfully, but completing the level is not timed in which a processor is programmed to automatically replenish a life for a player in 30 minutes in which a processor is programmed so that, if a player finishes a level in under the target number of moves, the random game elements on the game board are triggered and give the player bonus points in which a processor is programmed so that, if a level is finished with moves left, those moves are converted to special game elements that trigger for extra bonus points in which a processor is programmed so that the game generates and displays congratulatory messages when the player scores more than a predefined amount, or matches more than a predefined number of game elements, in a single move in which a processor is programmed so that the player can ask his friends for lives in which a processor is programmed so that the player can ask his friends for other help in which a processor is programmed so that the game can be synchronized between different devices in which a processor is programmed so that the player can send gifts to friends in which a processor is programmed so that a player can seamlessly stop and re-start playing the game at any time since game state information is stored, e.g. remotely and/or on the playing device in which social network friends are prompted to assist another player if that other player has played, but not completed, a level meeting a certain criteria in which every change in the game state, such as every move of a game piece by the user, and every consequential change in every game piece on the game board, is accompanied by sound and visual feedback to provide immediate, positive gratification to the player in which game state information is preserved, enabling a remote server system to identify a player and all aspects of the state of the game they are playing, so that the player can end game play on one device and resume from a different device at a later time at exactly the same state In which the different device can be a different type of device, so that the player can move seamlessly between playing the game on a smartphone and on a tablet In which the remote server system can identify a player because that player has accessed the game through a social network In which the processor is programmed to show a virtual path or other virtual world that indicates the level reached by the player and that player's social network friends in which the game is a casual, social game, namely a game that can be downloaded as an app to a smartphone and/or tablet computer and which can be accessed or played using a social network application or environment A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device; and in which one or more processors are programmed such that:

the gameboard includes an entry point and one or more exit points and the player completes a level of the game if he or she clears elements to make a path from the entry point to an exit point;

and the game includes a virtual path though which the player progresses if he or she completes a level of the game;

and that virtual path can, at some nodes, fork in several different directions and the position of the exit successfully reached in the gameboard determines which fork the player will take through the virtual path if the player completes a level.

A third aspect is:

A non-transitory computer readable medium encoded with instructions for controlling a computer system to display a game on a display; and in which the instructions running on the processor(s) result in:

the gameboard including an entry point and one or more exit points and the player completes a level of the game if he or she clears elements to make a path from the entry point to an exit point;

and the game including a virtual path though which the player progresses if he or she completes a level of the game;

and that virtual path can, at some nodes, fork in several different directions and the position of the exit successfully reached in the gameboard determines which fork the player will take through the virtual path if the player completes a level.

BRIEF DESCRIPTION OF THE DRAWINGS

FIG. 16 shows an exemplary line blast element.

FIG. 17 shows an example of what a colour bomb may look like.

FIG. 18 shows an example of an ice block containing game elements.

FIG. 19 shows an example of a clay blocker with two layers on the left and one layer on the right.

FIG. 20 shows an example of a rock blocker with two layers on the left and one layer on the right.

FIG. 21 shows an example of a non-removable, fixed blocker that game elements can't be placed on top of but can fall through if there is an empty space underneath.

FIG. 22 shows an example of a non-removable, fixed blocker that game elements can't be placed on top of or fall through.

DETAILED DESCRIPTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
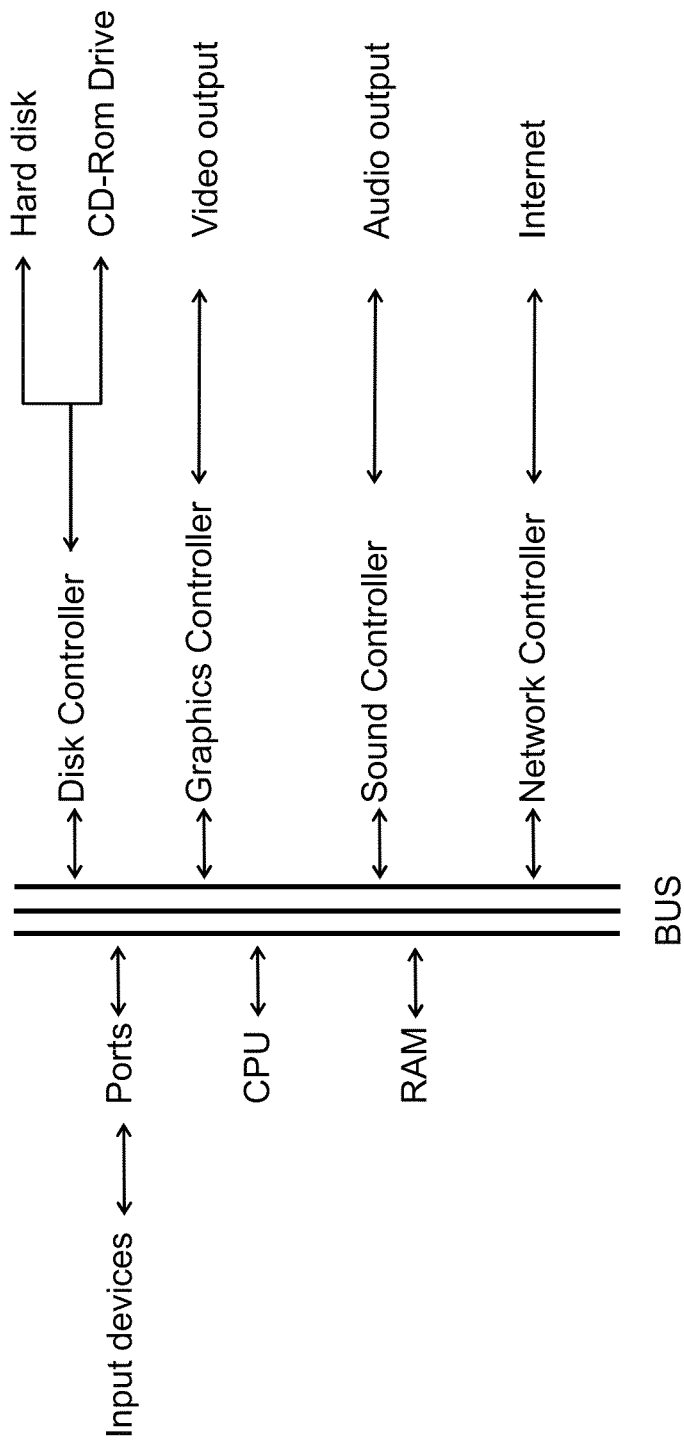
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
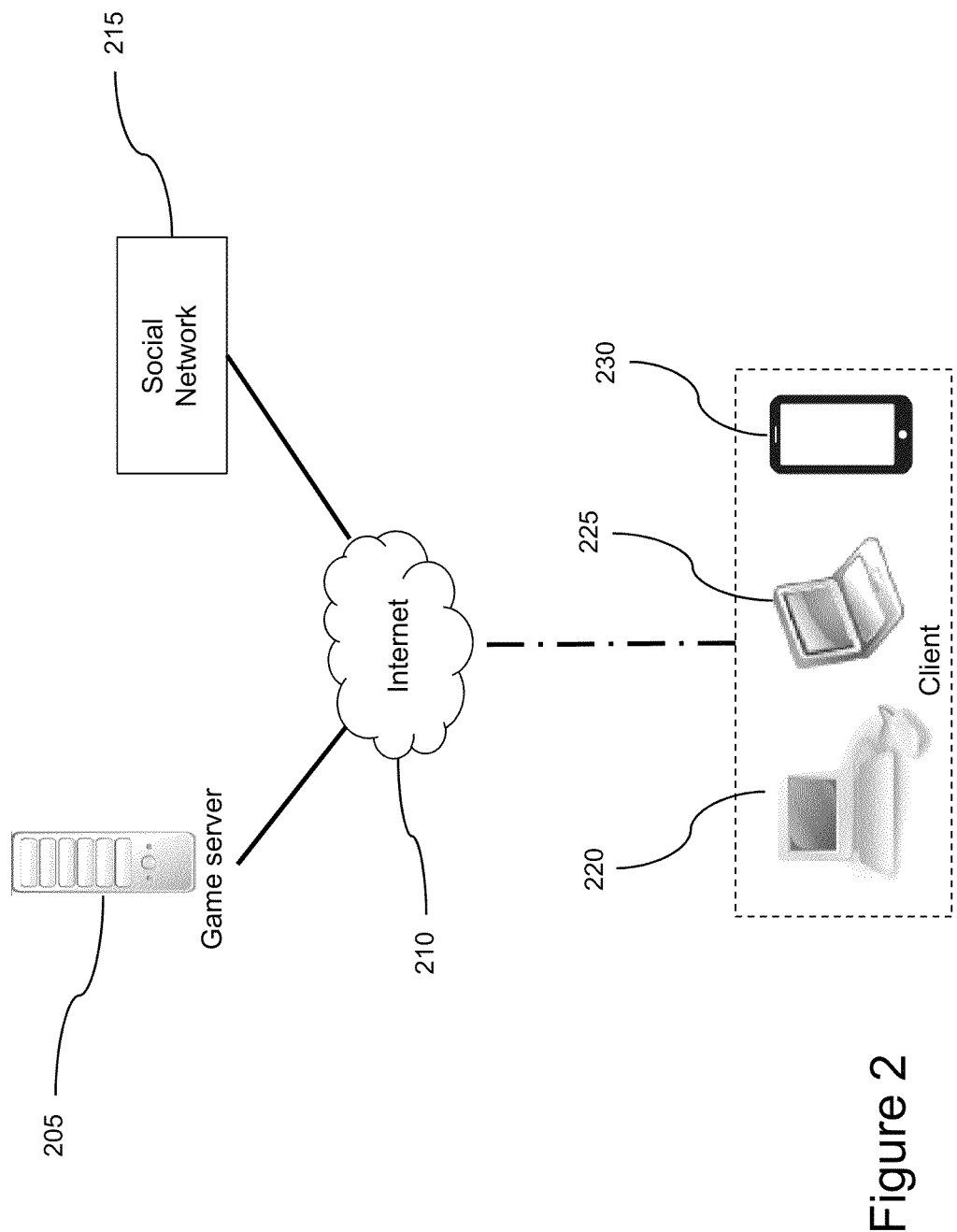
FIG. 2 shows an exemplary environment.

FIG. 2 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 do not have to be located in different places; they could be on the same server or on a plurality of servers located in different locations. An environment where the invention may be implemented is described in PCT/EP2013/060641 which is hereby incorporated by reference. People skilled in the art will understand that other devices than the exemplary ones listed can also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game by using a touch screen where the user can select and/or move elements on the game board with a finger or for instance with a stylus. The game can also be played with a pointing device such as a mouse or other interaction devices such as a keyboard.

Over the course of players playing the game, data will be produced. This data can for instance be related to a player's game performance or to game information related to a social network to which the game is connected. It is possible to gather this data, store it and make use of it, for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves, or giving the player, for instance, a booster to enhance the gameplay.

There can be certain performance indicators used to measure the success of the game. These indicators can for instance relate to player retention, the virality of the game and the revenue of the game.

A person skilled in the art will realise that the different approaches to implementing the game are not exhaustive; what is described herein are certain preferred embodiments. It is possible to implement the way in a number of variations without departing from the spirit or scope of the invention.

Detailed description

The game described herein can be a clicker or a switcher game. The player may in some implementations click on clusters of three or more game elements of a certain type which will remove the cluster of game elements and introduce new ones to take their place. The game board can for instance be a grid of maximum 9×9 tiles and there may be several different types of game elements on the game board.

Some additional elements can also be present on the game board. Such additional game elements can be fixed in a certain position on the game board or can be moveable. In some implementations the shape of the game board may vary so as to make the game more challenging as well as offering the player variation in the game.

The ideas described in this document are to some extent implemented in the game 'Diamond Digger Saga' by King.

Game Overview

Figure 3:
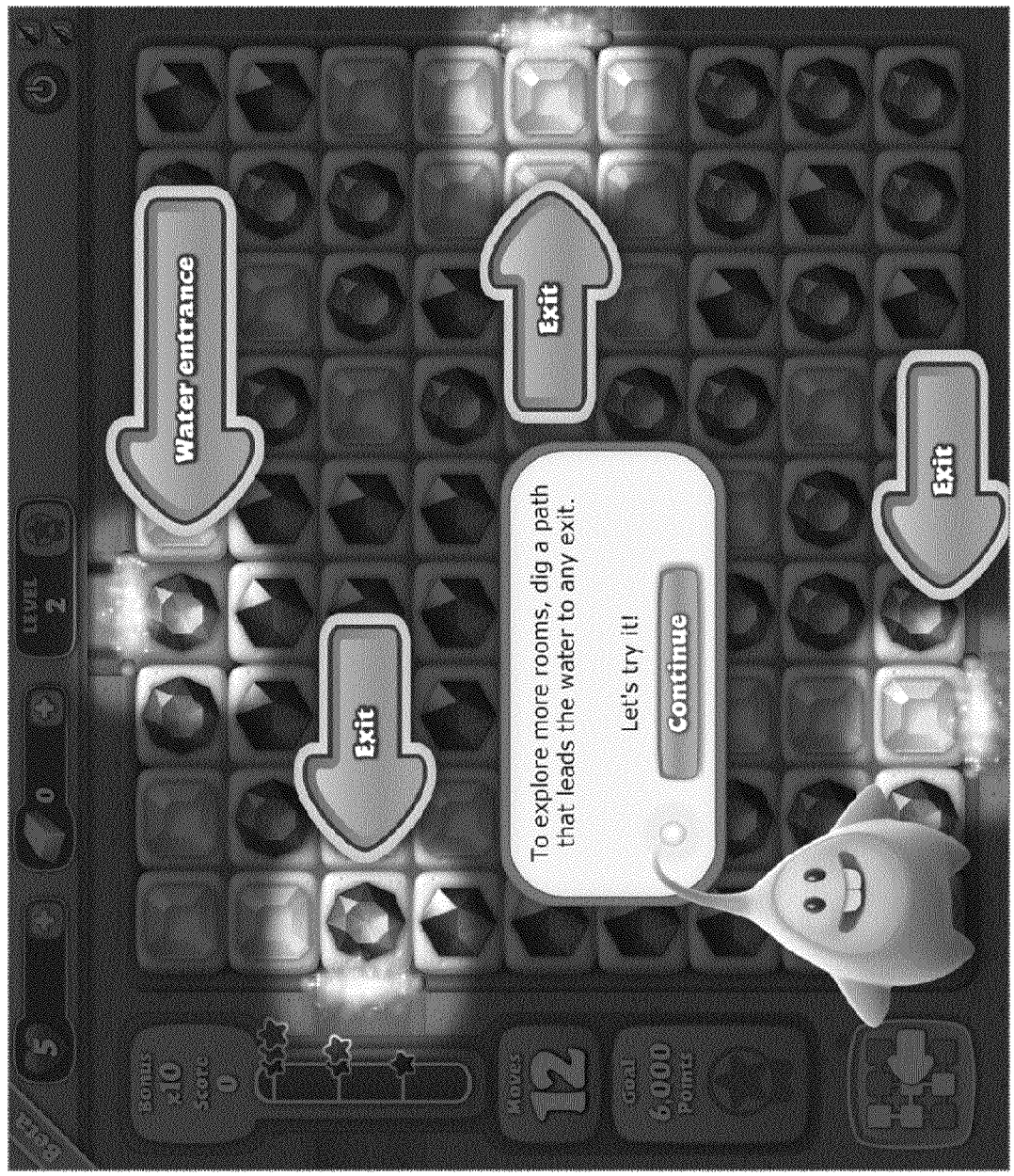
FIG. 3 shows an example of a room in a level with one entry point and three exit points.
Figure 4:
FIG. 4 shows an example of a level layout that includes 20 rooms.

The game described herein can be played over several levels in a progression type setting where the player advances to more difficult or different levels. Each of the levels in this game is divided up in a plurality of 'rooms' where the player within the level advances from room to room. The rooms are connected with entry and exit points and the player can adjust his gameplay to advance the game through a certain exit point in to a different room as shown in FIG. 3. FIG. 4 shows an exemplary embodiment having 20 rooms.

The game consists of three main elements that may be combined and/or altered to fit the specific level.

Clicking on existing groups of elements on the game board. Each tile in the game board has a layer that is destroyed once a game element on top is removed. The removed layer creates a "path" on the game board.

"Water" flows from the entry point on the board and the goal for a room is to create a path for the water to flow to any of the exit points in the room. Which exit point the water reaches determines which the next room on the level the player will advance to.

Figure 5:
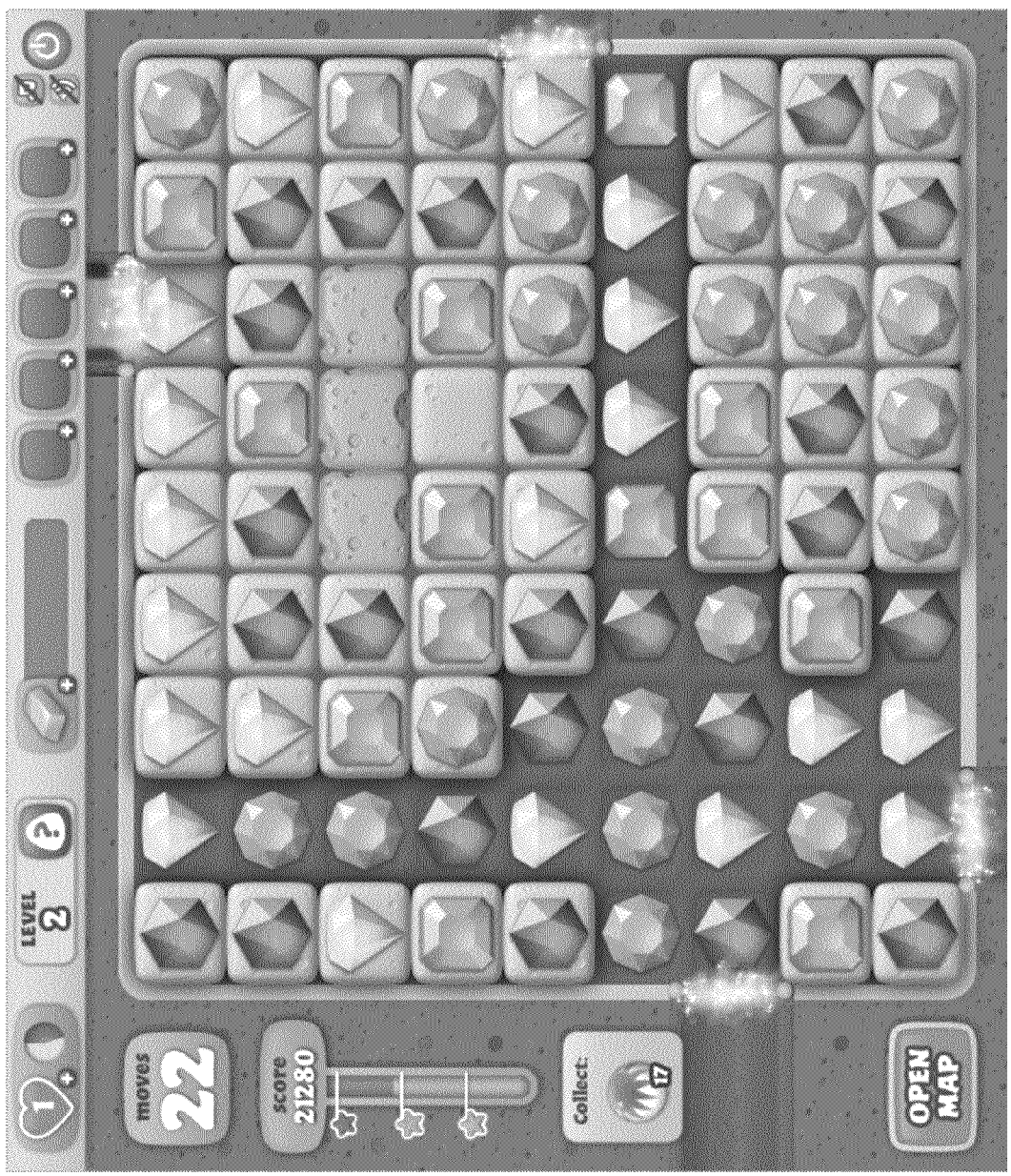
FIG. 5 shows an exemplary game board layout.

FIG. 5 shows that in the top right corner a blue marker with water indicates the entrance of the water. The other exits in the bottom left are in a typical implementation sparkling gold.

Figure 6:
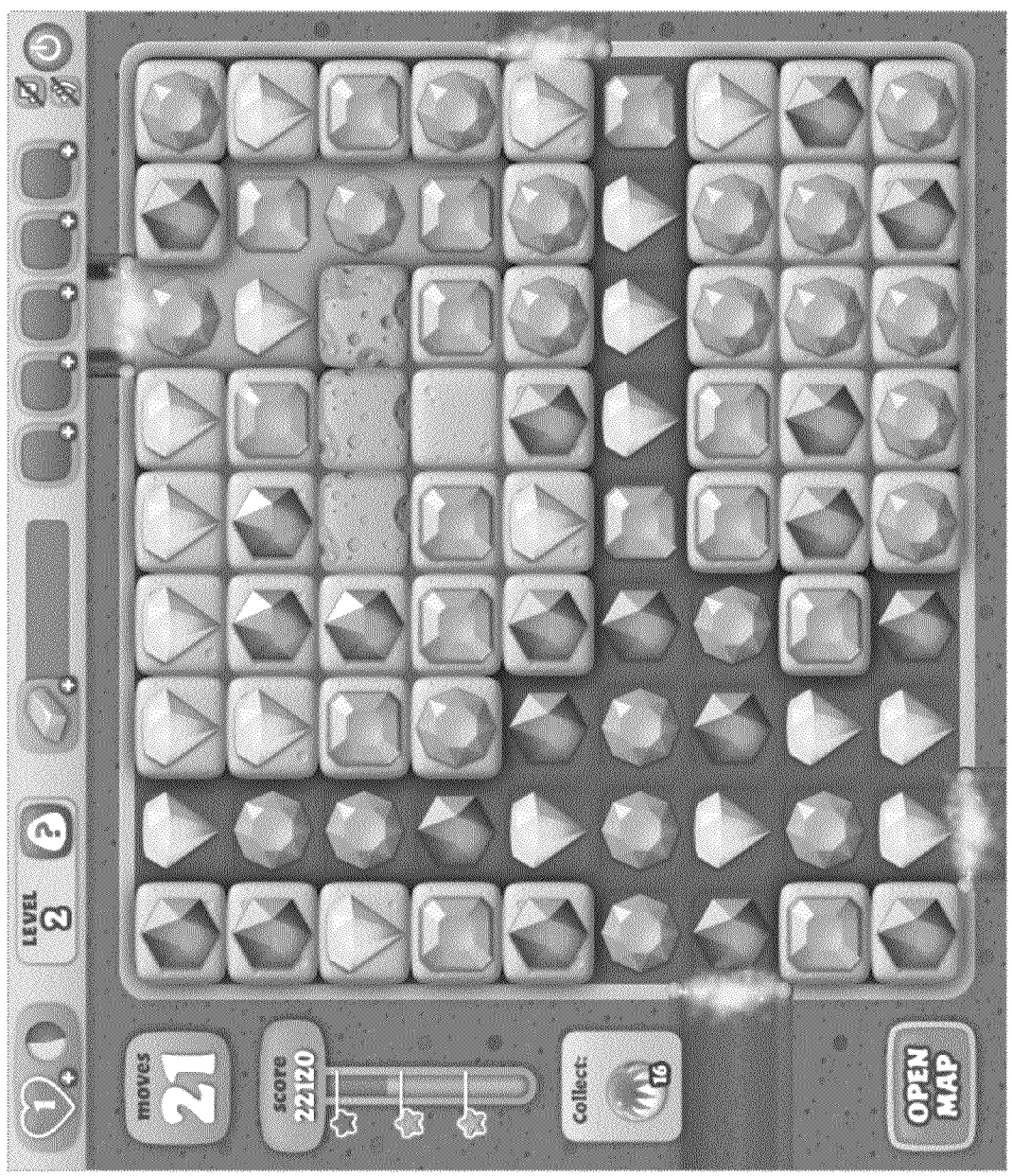
FIG. 6 shows an exemplary game board layout.
Figure 7:
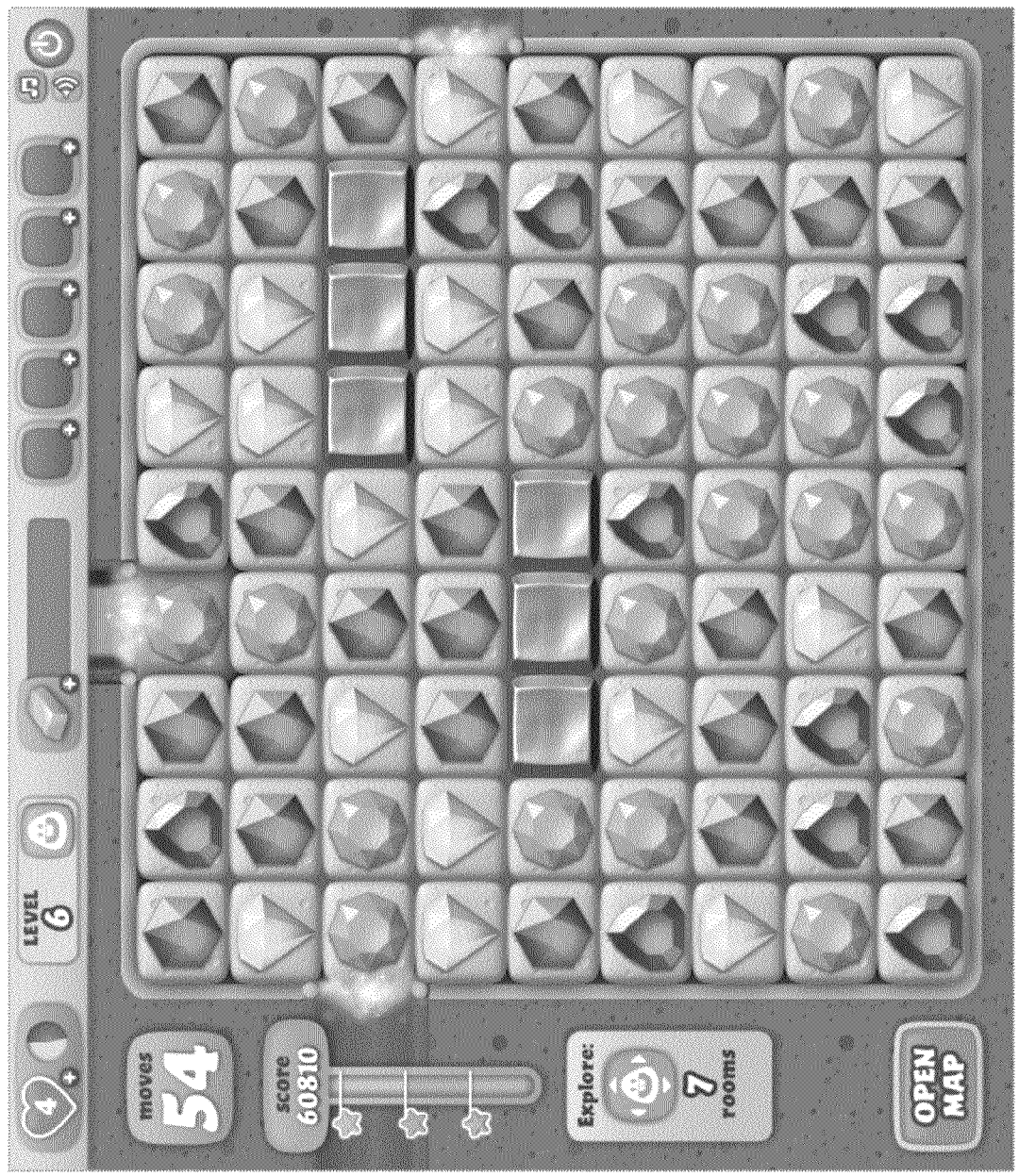
FIG. 7 shows an exemplary game board layout.

FIG. 6 is an example of what the game board may look like. It shows that the water is following a path in the top right corner and if some more dirt blocks are cleared then it will reach the other two exit points in the bottom left. The game elements with darker background show where dirt blocks have been removed. Another example is FIG. 7 where controls are found in the top right corner.

In some implementations, the game elements covering the game board are implemented as jewels. Any group of 3 game elements or more of the same colour that are horizontally or vertically adjacent can be cleared away and replaced by new game elements that fall into place from the top of the game board. Behind the game elements are game blocks implemented as dirt. When game elements are cleared away, the dirt layer behind them is also cleared which creates cleared paths on the game board. Clicking on clusters of three or more game elements of a certain type will dig paths on the game board.

On the edges of the game board there may be an arbitrary number of exit points together with one entry point. The entry point may for example have water that will flow on the game board and fill the cleared out "path". At each level a marker of for example, blue highlights the water's entry point on the game board. The challenge is to remove game elements in a smart way to create a path and connect the entry point with one of the exit points. Connecting an entry and exit point will take the player to a new game board that may be even deeper underground. If reaching a new game board, the entrance point may be located in the same position as the exit point that was used on previous game board. When the water reaches one of the other exit points available on the game board then the level may be completed but as mentioned may also continue onto a new game board which may be part of the level or an extra bonus part of a level. If the water reaches more than one exit point at the same time, then the bottom exit point will always be chosen if applicable. An exit point may in some implementations not be located on the top edge of the game board.

The game can be implemented so that the first exit point that is reached with the path is the one that is used. Should two exit points be reached at the same move then one of the exit points can take priority, for instance the bottom one over ones on the left and right side. It can also be implemented so that it is random which exit point that takes priority.

The deeper the player reaches, the more treasures and gold will be located on the way. The real challenge is doing this with as few moves as possible. Extra moves are being rewarded for completing a game board which will then let the player continue until running out of moves or time.

Clearing a level will also raise a standard score multiplier, giving the player more points on the next game board reached within the same level.

There is a limited amount of moves/diggings possible; this is shown to the side of the game board as a number of remaining moves which can be seen in FIG. 5. Clearing large groups of jewels gives bigger scores and sometimes bonus moves. A good strategy is therefore to go for large groups to both conserve moves and get a high score.

As digging through a level, treasures may be uncovered in the shape of gold and chests that give a score bonus, as well as a score multiplier that doubles the score for the rest of the level. Extra moves can also be found in the ground. The deeper the digging, the more treasure will be found. A good strategy is to always aim, if sensible, for bottom exit points when digging rather than sideways exit points.

Some levels also have blockers in the shape of rocks instead of regular dirt blocks. These require the player to clear game elements twice on top of them to excavate a path for the water. Other types of blockers may also be encountered.

Game Flow

The game is a clicker game that may be time based or it may be more relaxed with a limited amount of moves. What makes the game different from other match-3 clicker games is that one level may consist of several sub levels where the player is digging paths between an entry point and exit point to reach the different sub levels. Compared to other games that don't have sub levels, the game focuses on the challenge of transportation by completing these sub levels. Using fun map sections with challenges, treasures to discover and selling extra moves gives a unique breed of a game. There are other games that also have a map of a level but what is different is that those games have a map with a giant game board that scrolls new areas into view while playing. Diamond Digger Saga has divided their levels and uses several game boards on one level map instead of one giant game board.

There are maps both within a level for the player to plan which game board is best to try and reach, as well as outside of levels for the player to be able to choose which level to play; perhaps the furthest reached level or maybe a previously completed level, to try and beat a high score.

The goal of the game is to dig down through as many game boards as possible and on the way reach enough points to pass a level or to beat ones own or other friends' high scores.

Story & Theme

In some implementations, the theme is colourful and cute with fantasy creatures and friendly insects with personalities spread out on a map of seemingly flying round islands.

The player follows a path and, for each level, the player guides a yellow star shaped character with an antenna on its head, which glows in the top. This character is displayed on the specific maps for a level and shows which game board has been reached.

Controls

In some implementations, the controls for turning on and off music and other sounds may be found in the top or bottom right corner.

If wanting to end the game prematurely, the End Game icon can be pressed in, for example, the top or bottom right corner.

Levels

Levels have different stages and are in a way a bit more complex compared to other match-3 clicker games. In a typical implementation there are sub levels as well as bonus levels.

Sub Levels

Levels are divided into several sub levels where each sub level has its own game board. The goal for each sub level is to create a path between an entry point and an exit point. In some implementations there is one entry point and one to three exit points. In other implementations the number of exit and entry points may vary.

By completing sub levels (game boards), the player is working towards the main goal of the whole level. In a typical implementation; moves, timers and points are shared throughout the main level and are not separated between the sub levels.

Bonus Mode

Figure 8:
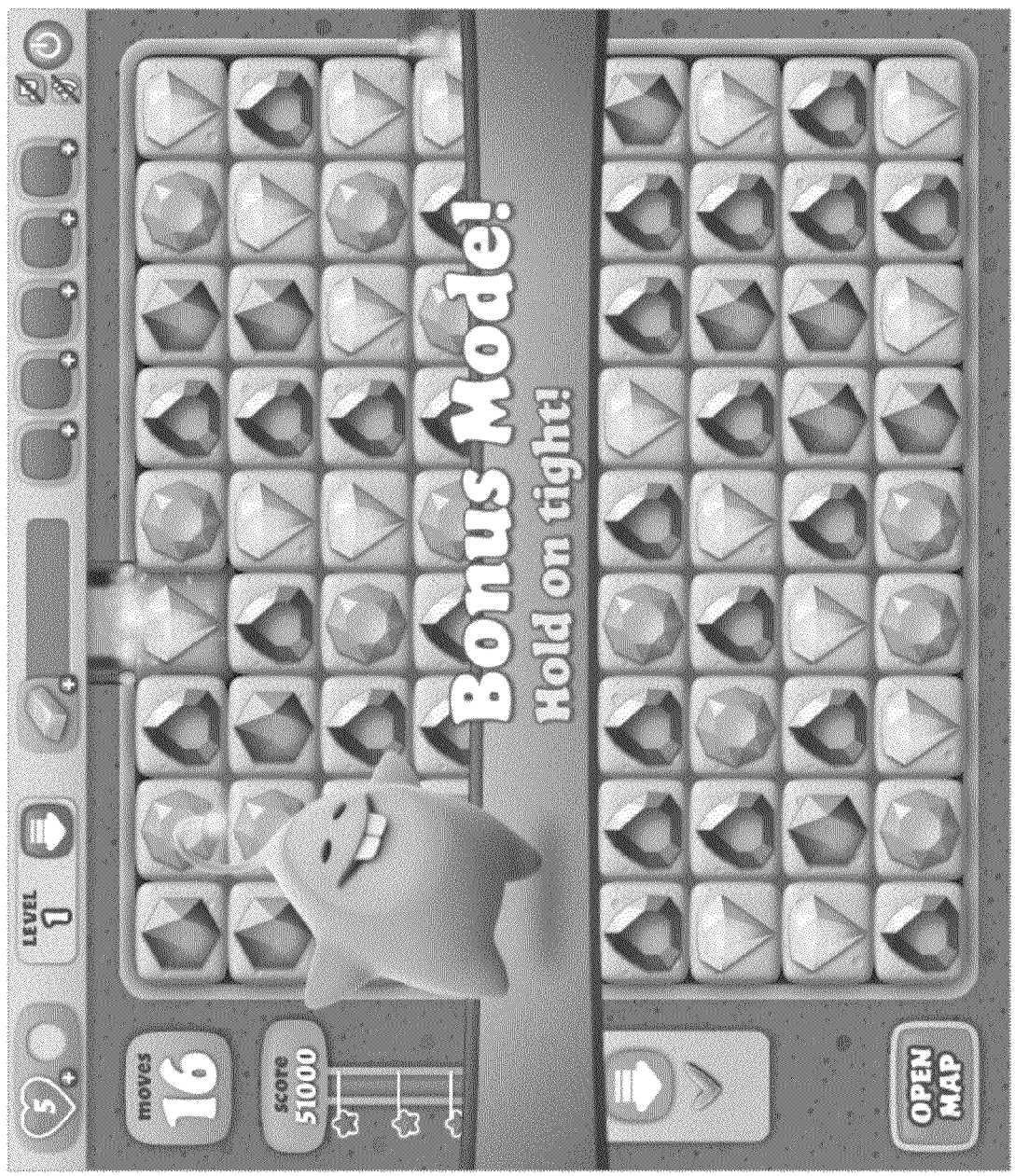
FIG. 8 shows an exemplary game board layout indicating a bonus mode.

The player may continue in bonus mode if completing a level with either moves or time left. FIG. 8 shows an implementation where the bonus mode is signalled to the user with a banner over the game board. If doing so, the player continues either on the current game board he is on, or a new game board may be opened where the player simply creates as good and as many matches as possible before time runs out, or there are no more moves left. In bonus mode the player does not need to worry about connecting an exit and entry point, as at this points it is only about earning more points for the final score.

Map

The game has two types of map: One world map outside of levels, and another map during the play of levels.

World Map

Figure 9:
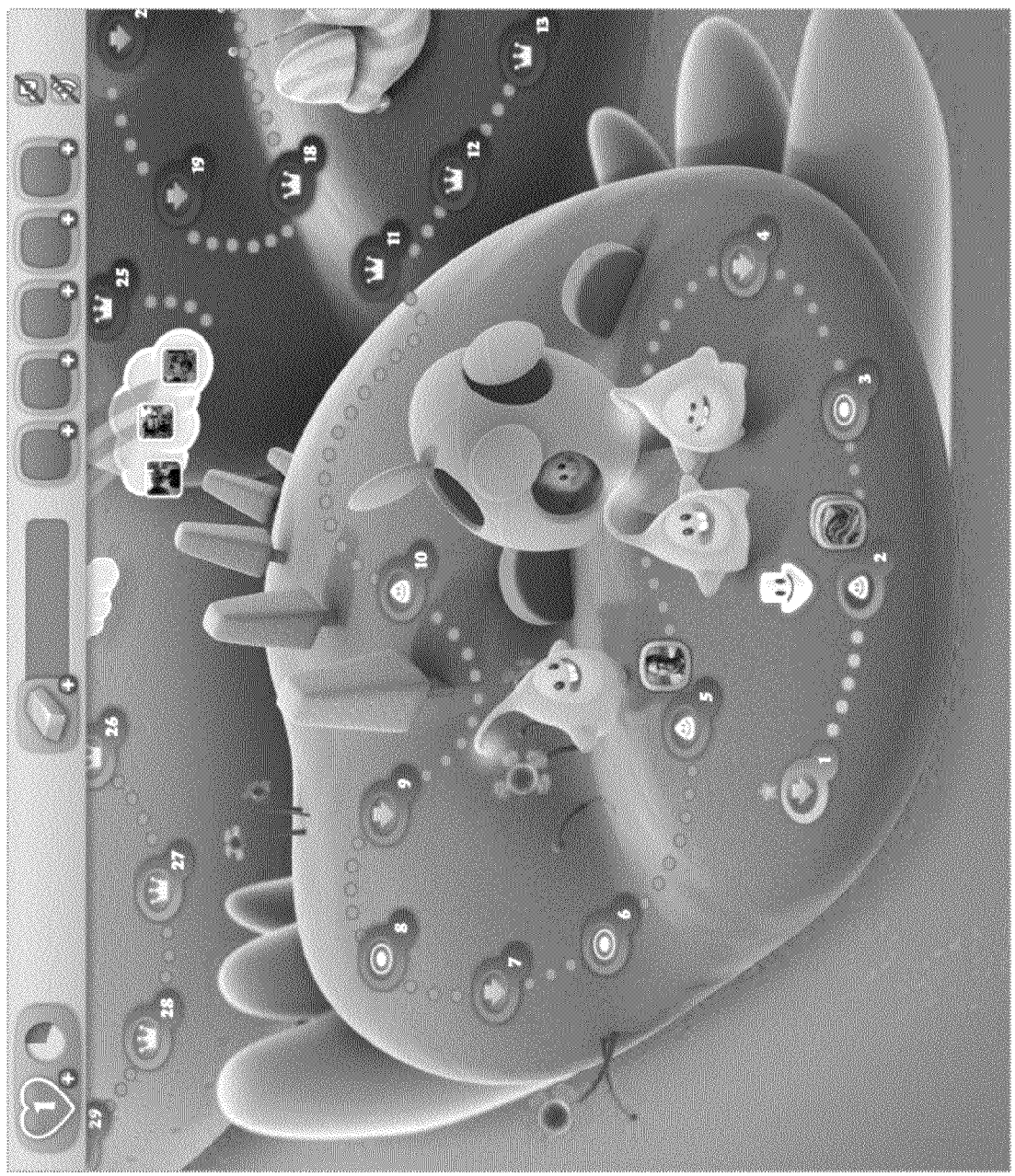
FIG. 9 shows an example of map view where the player currently is at level 2.
Figure 10:
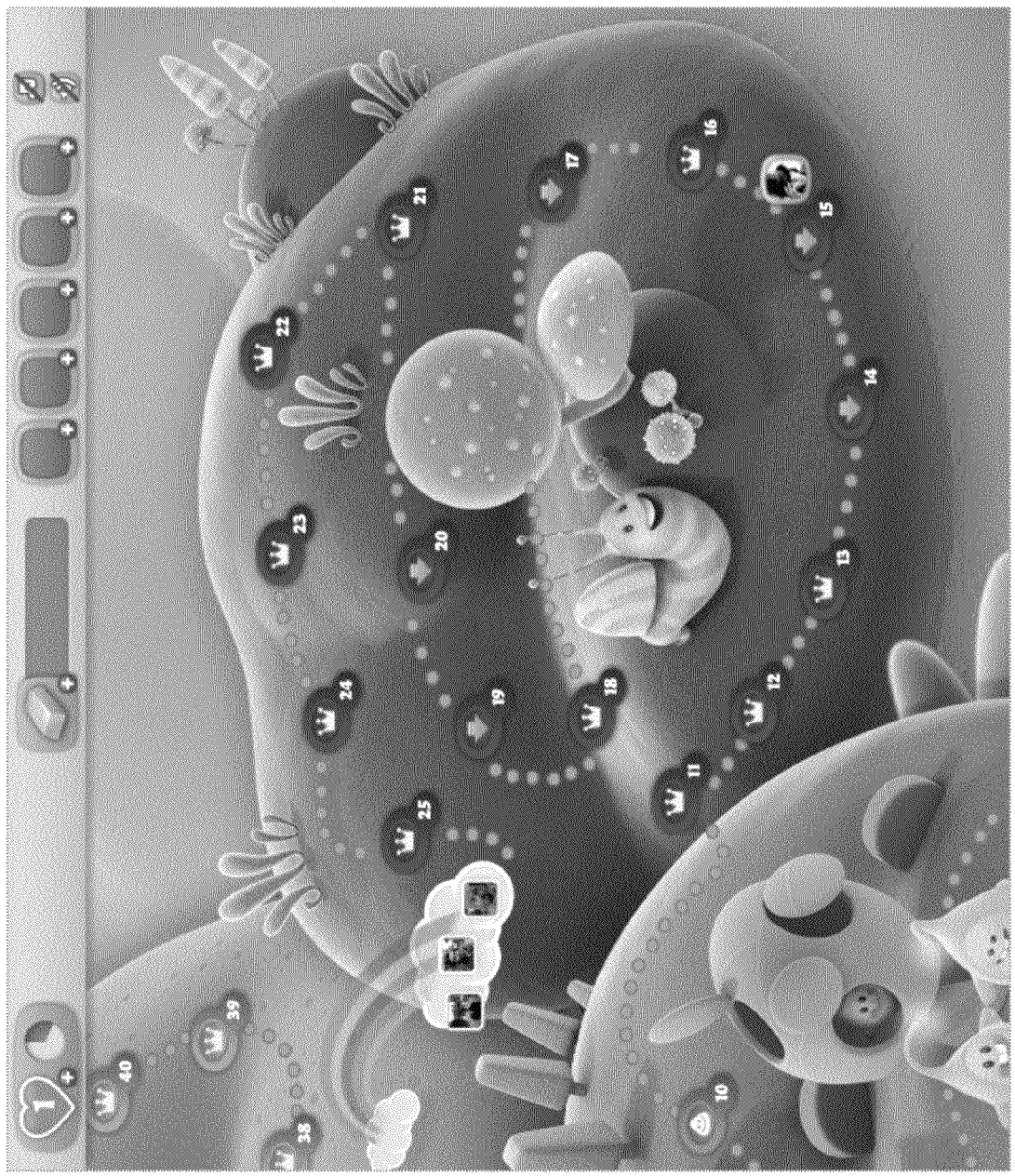
FIG. 10 shows an example of map view.
Figure 11:
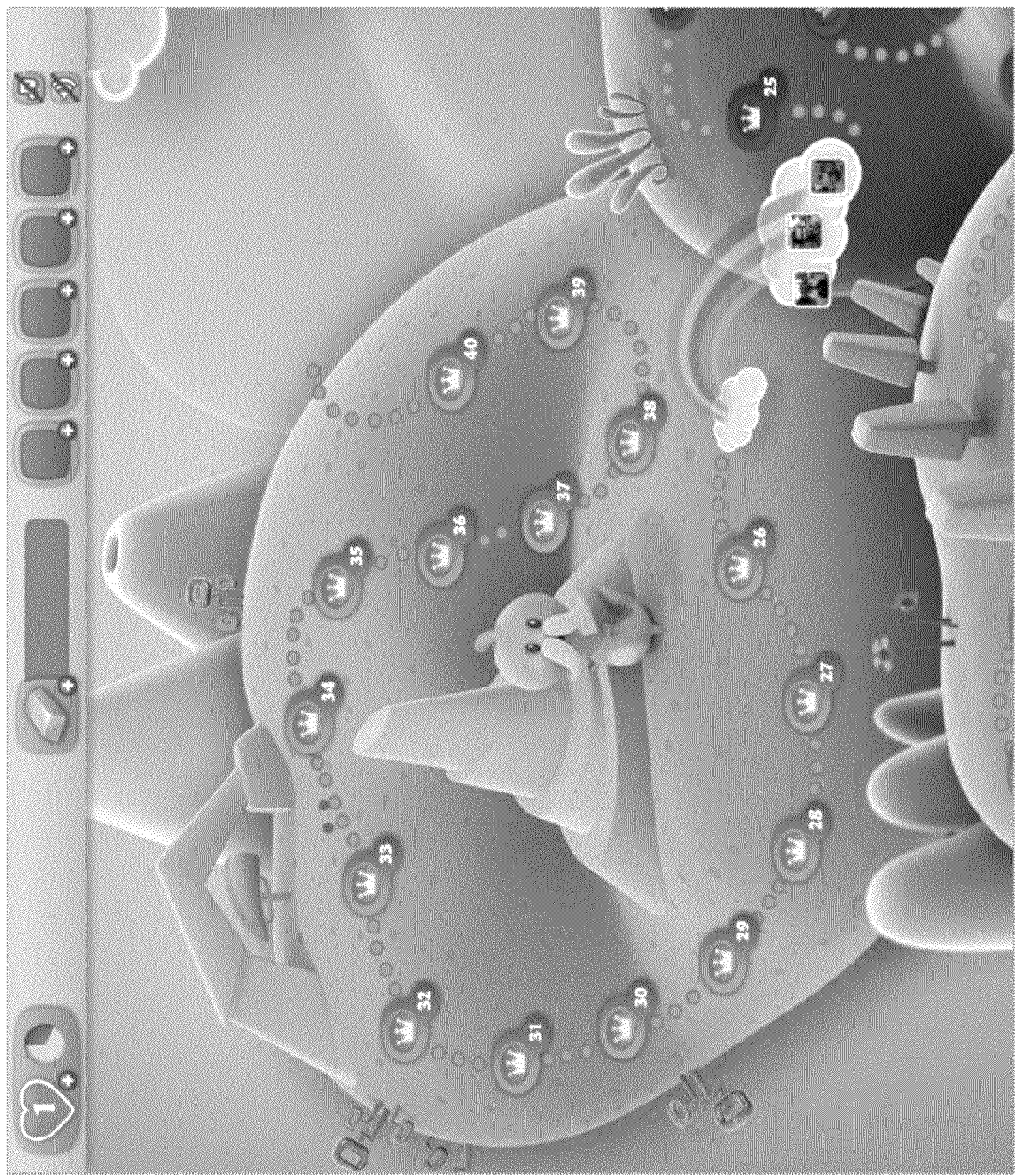
FIG. 11 shows an example of map view.

The world map takes the player on a journey through a cute fantasy world as can be seen in FIG. 9, FIG. 10 and FIG. 11. For each level completed, the player moves forward on the map. In some implementations, there may be characters with stories that the player meets along the way. When jumping from one area to another the player may travel over a rainbow to get there. Having a map in the game encourages the player and makes a graphic representation of the player's progress in the game.

Besides seeing one's own progress on the map, the result of previously completed levels can be seen. Number of lives left may be displayed, as well as possible in-game currency and boosters.

Level Map

This map is displayed just before starting a level. It can also be viewed at any time during the play of a level.

The level map displays all the possible sub levels available, as well as giving hints on which sub level contains more treasures and items compared to other sub levels. The player can see which sub levels they have already completed and how many more they may need to complete. By showing all this information, the level map helps the player to be strategic; on which sub levels to reach for and which ones to avoid.

Figure 12:
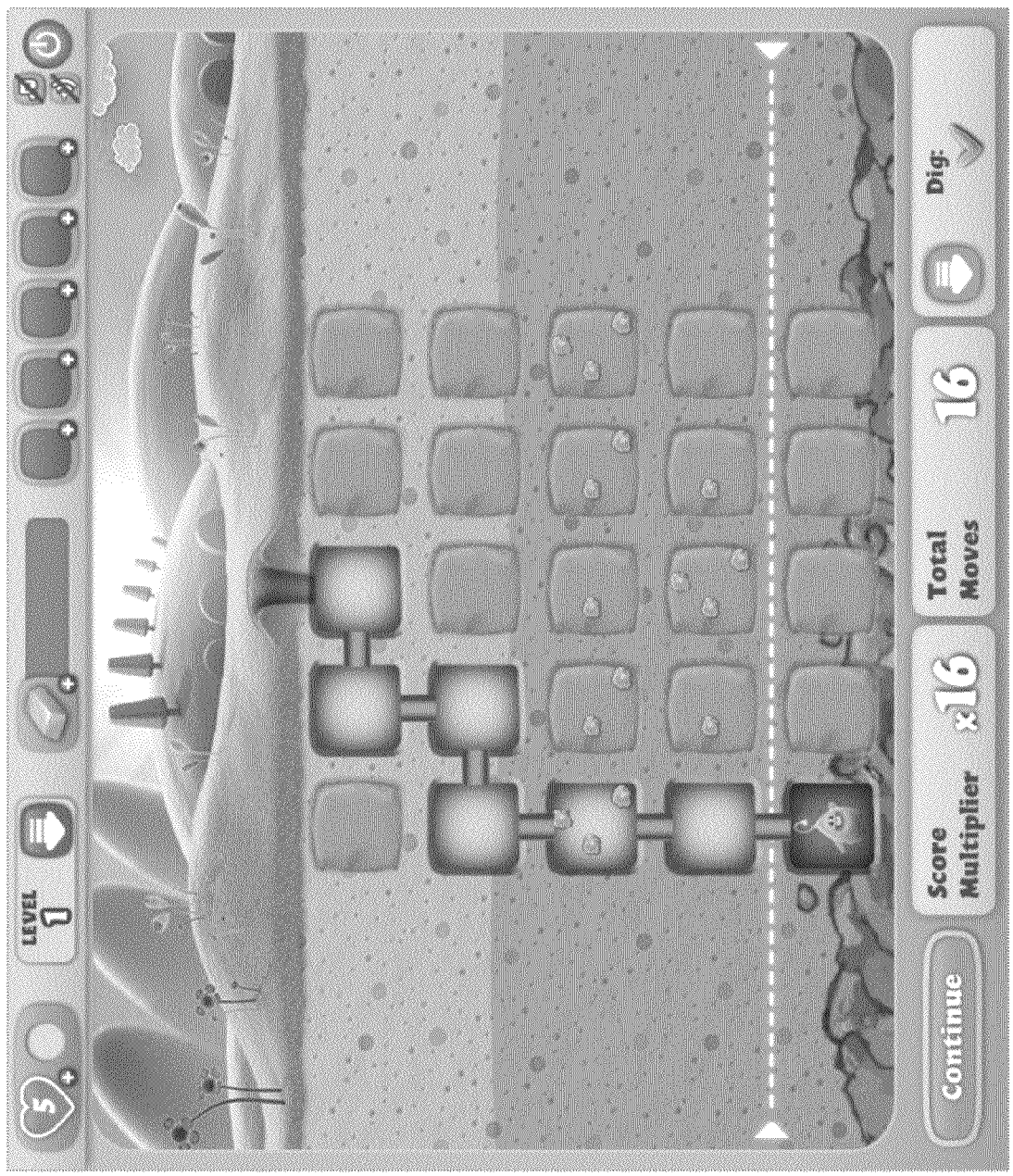
FIG. 12 shows an exemplary game board room layout.

In some implementations the level map looks different, depending on what type of level is being played. If a level has the goal to reach to a certain depth then the level map may have a marker implemented as, for example, with a white dotted line, showing how deep the player needs to go. Example of a level map where the goal of the level is to dig down to the bottom is shown in FIG. 12. The filled in squares represent each sub level the player has completed while unfilled squares represent sub levels which have not been visited. The rocks scattered on some of the squares may indicate that there are more treasures to be found on those sub levels.

Figure 13:
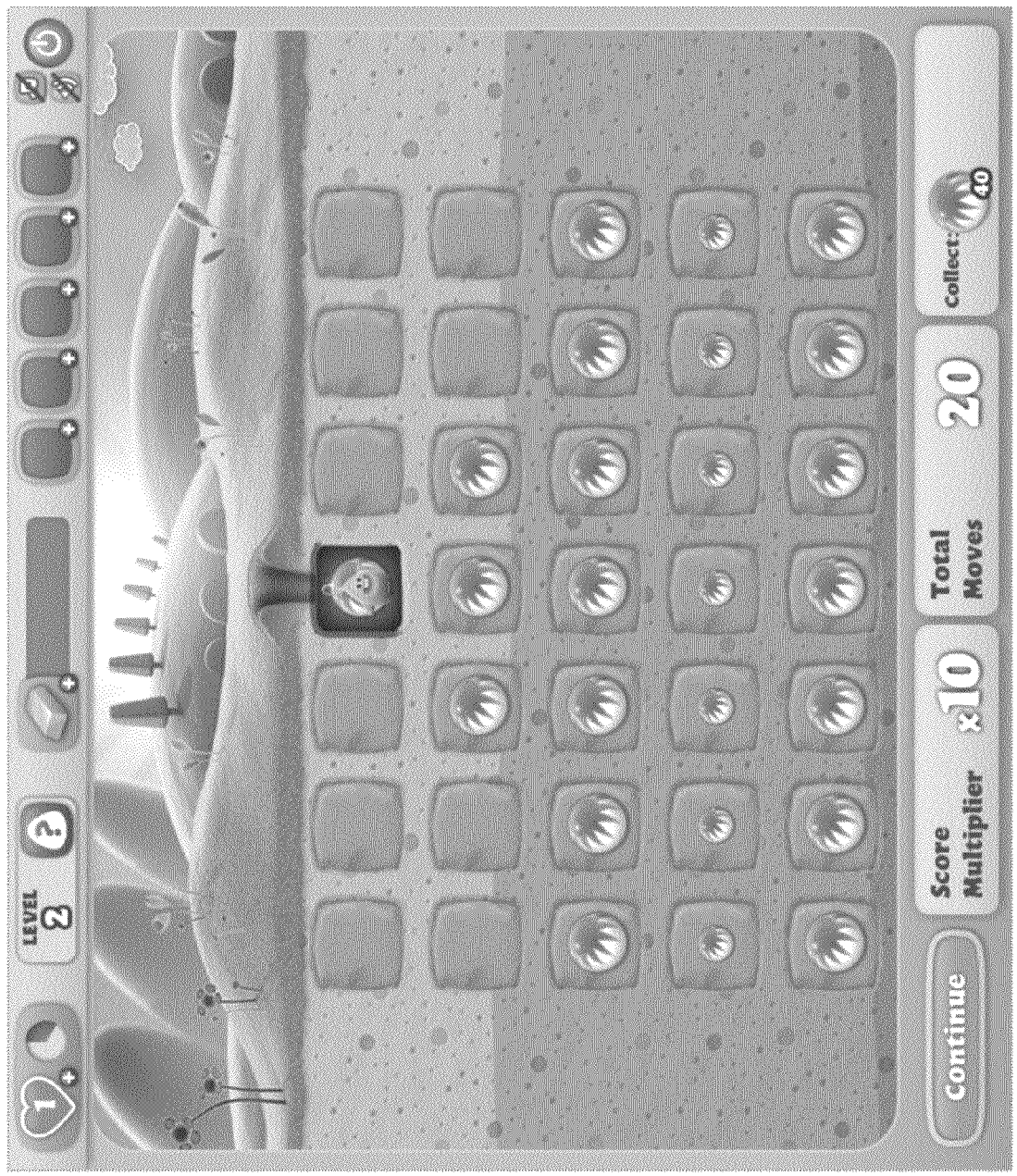
FIG. 13 shows an exemplary game board room layout.

If the goal of a level is to collect a certain number of items, then sub levels may have indicators on them showing if they contain many, a few or none of those items See the example in FIG. 13. The player should try to strategically choose a path where the most items can be collected.

Figure 14:
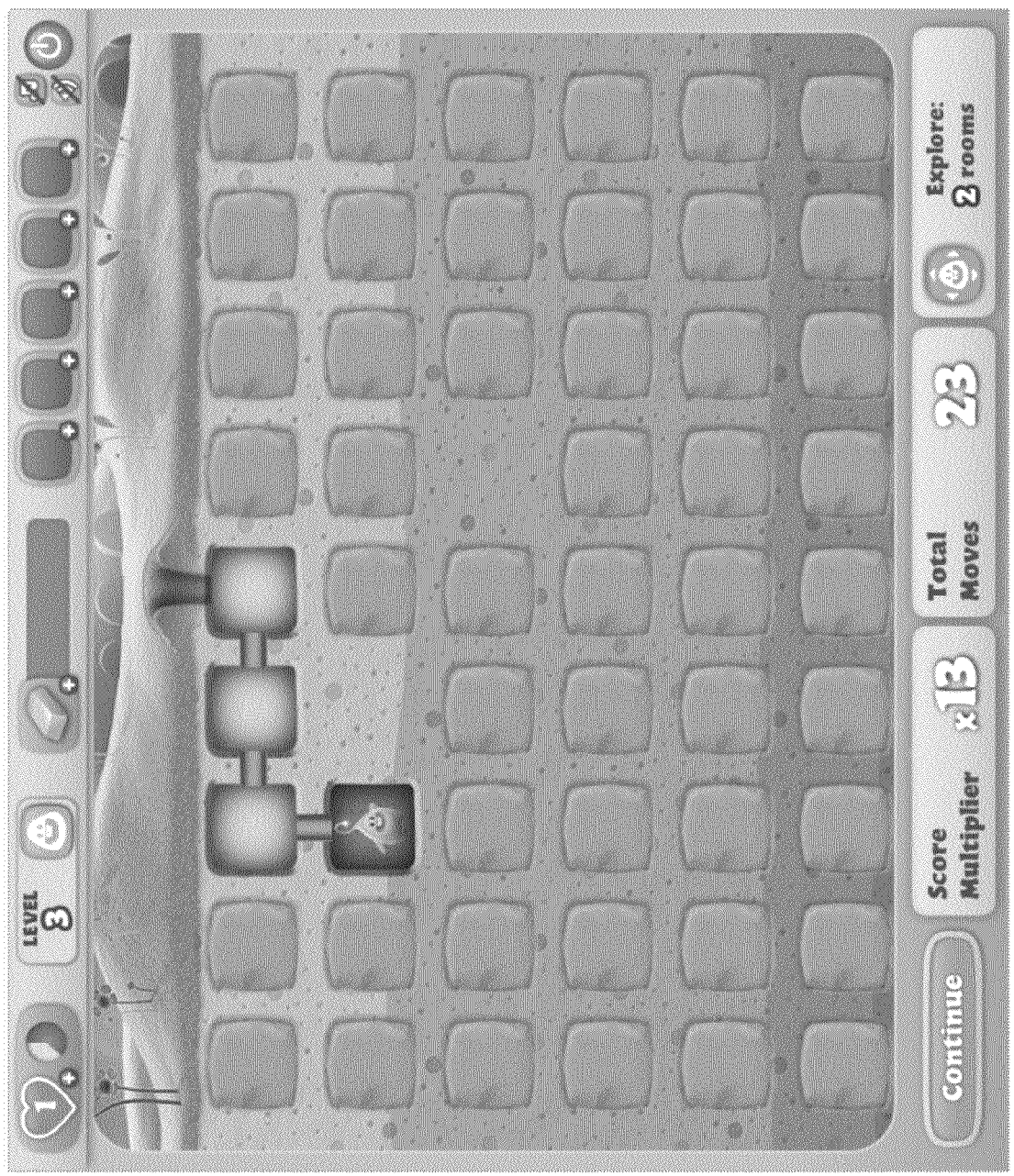
FIG. 14 shows an exemplary game board room layout.

If there is another goal just to pass a certain number of sub levels, or as many sub levels as possible, then the map does not have any of the above mentioned markers See the example in FIG. 14.

Game Modes

Not all levels have the same goals in order to be completed. There are several different kinds of levels where different goals need to be fulfilled in order to complete the level. On all levels with limited moves, the moves are shared over all the game boards and only a few moves are returned in between game boards. Therefore, the player needs to be tactic and try and use as few moves as possible to be able to complete a level.

Dig to the Bottom

Here the player needs to dig down to a certain depth on the level map. After reaching the required depth as well as having collected a predetermined minimum amount of points, the level will be completed. If moving sideways on the level map then the player does not come closer to the level goal but may earn some more moves as well as extra point. The total number of moves is connected to all sub levels on that level and not just the current one being played. It is therefore important to try and spend as few moves as possible; to ensure you have moves left when reaching later sub levels.

Collect All Items

In this game mode the player needs to collect a certain number of items to pass a level. The items are found by removing dirt blocks on the game board. On this type of level, not every sub level has items to be found. The player needs to look at the level map and strategically choose where to go; hence it may not always be the best option to move straight down on the level map.

Explore Rooms

This game mode requires the player to complete an arbitrary number of sub levels, which in some implementations are referred to as rooms. It does not matter how deep the player journeys on the level map but only the number of sub levels completed.

Combos & Points

Figure 15:
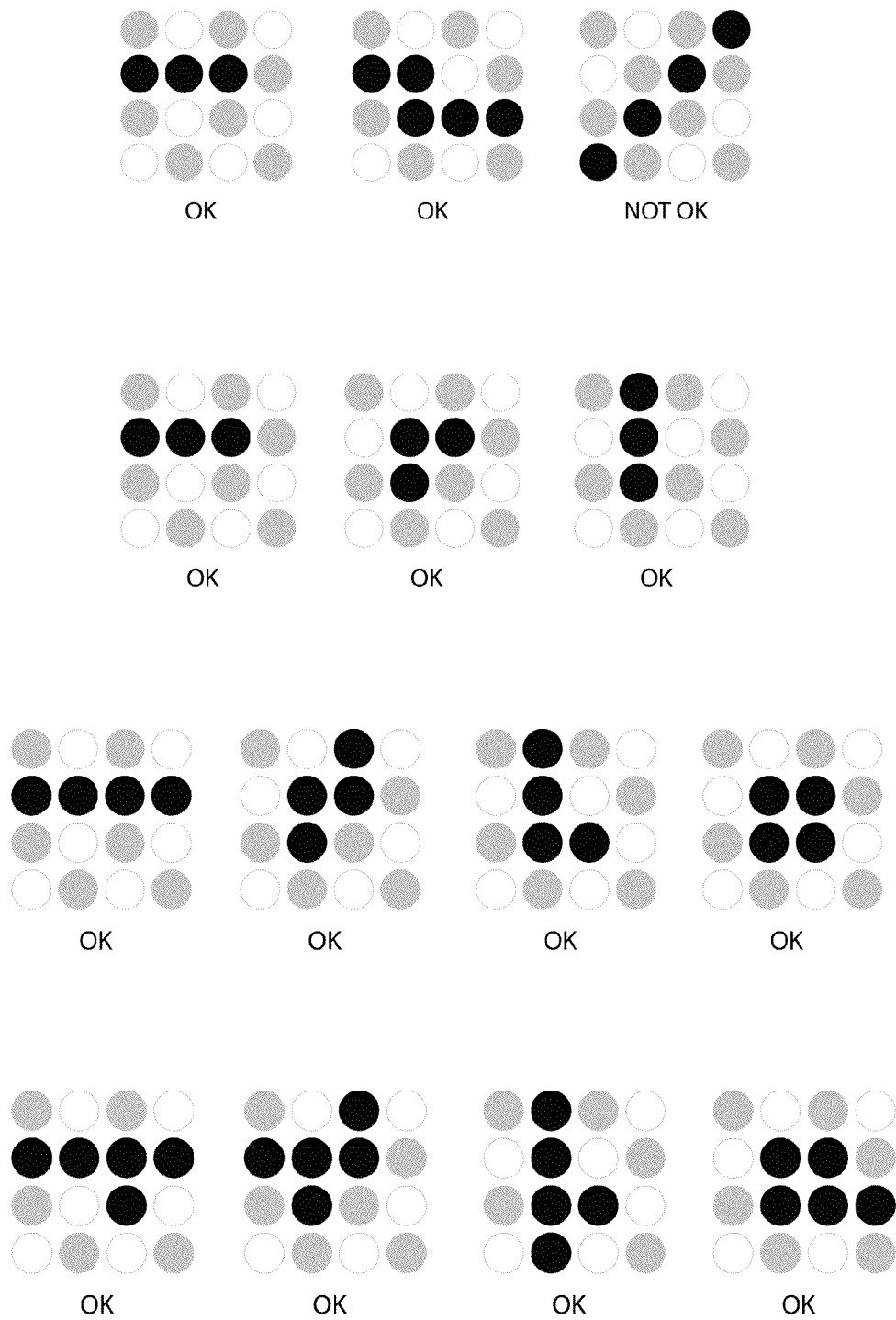
FIG. 15 illustrates possible combinations in one implementation.

Depending on how and how many game elements are removed, different amount of points are given. To create matches with game elements, the game elements need to be placed in a group where one side of a game element is adjacent to the other game element. It does not need to be a straight line as long as the game elements are adjacent to each other. For example, a diagonal pattern would not be matchable while an L-shaped group would be. FIG. 15 illustrates what patterns are matchable.

Colour Combos

Colour combinations are the most basic way of progressing in Diamond Digger Saga. Used to earn points, uncover treasures and other bonus items such as extra moves. They are also used to create paths on the game board in order to connect entry and exit points. Colour combos make up the bulk of the gameplay in the game.

3-Combos

Combinations made from three game elements of the same colour are the most basic combos in the game. In some implementations this combo gives 10 points.

4-Combos

In some implementations, combinations made with four game elements award 20 points.

5-Combos

In some implementations, combinations made with five game elements award 30 points.

Multi-Combos

In some implementations, combinations made with more than five game elements reward +10 points for each additional game element in the group.

Dirt

The dirt is placed behind normal game elements. In some implementations it will award 10 points per piece when removed.

Blocker

In the game there are different types of blocks and blockers. In some implementations, clearing a piece of ground or rock award 10 points per piece.

Using a Line Blast

In some implementations, a special game element called line blast awards is used, giving the same amount of points as if all the cleared game elements and ground blocks were a part of a regular group, for example a multi-combo group.

Using a Colour Bomb

In some implementations, using a colour bomb awards 10 points per removed game element and dirt block.

Level Multiplier

In some implementations, the game starts with a general level multiplier factor of ×10. For each sub level completed this factor is raised one step so that on the second level the multiplier is ×11, on the third level ×12 and so on. For example on level 1, the removal of a dirt block will award 10×10 points. On level 2 it would award 10×11 points and so on.

Special Multiplier

When creating paths on the game board, a special multiplier can be found under the dirt blocks that are being removed. If finding the special multiplier, the player's scores, including the standard level multiplier, are doubled temporarily until the end of the sub level.

Treasures

Different types of treasure can be found when clearing dirt blocks on the game board. In a typical implementation, some of these treasures are so called gold nuggets.

Finding one gold nugget awards 50 points
Finding three gold nuggets awards 100 points
Finding five gold nuggets awards 250 points There may also be treasure chests buried under the dirt blocks.

A small treasure chest awards 300 points
A medium treasure chest awards 500 points
A large treasure chest awards 1000 points All treasure scores are also affected by the level multiplier.

Objects

Line Blast

Sometimes game elements may appear on the game board that look like jewels with an arrow marker on them. The arrow indicates that the game element will release a line blast in the direction of the arrow when cleared. The line blast removes everything in front of the arrow either in a horizontal or vertical line. An exemplary implementation of a line blast can be seen in FIG. 16. The arrows on the line blast elements indicate the direction game elements will be removed.

Colour Bomb

As dirt is being removed on the game board, a game element may turn into a colour bomb. This is indicated by the game element suddenly starting to glow. Using the colour bomb in a combination will instantly clear all game elements of the same colour. An exemplary implementation can be seen in FIG. 17.

Extra Moves

In some implementations when the player is removing dirt blocks from the game board, the player can uncover a bonus item that immediately gives the player a few extra moves. The player could for example be given two or three extra moves although the number is arbitrary.

Special Multiplier

While removing dirt blocks, the player may also uncover special multipliers. If finding the special multiplier the player's scores, including the standard level multiplier, are doubled temporarily until the end of the sub level. Other implementations may have multipliers that triple the points or that are in effect during the course of a whole level. It could also be time limited and valid only for a predetermined amount of time.

Gold & Chests

In some implementations, some of the objects found when removing dirt on the game board are gold pieces and chests. They do not have any special effects but are still useful as they give the player bonus points. Receiving bonus points may be the extra hand needed to sometimes complete a level.

Blockers

In a typical implementation of the game there are several different kinds of so called blockers. Blockers are different types of blocks and game elements with the purpose of being in the way and making the game more difficult for the player. In this way, the game becomes more challenging for the player and at the same time may bring encouragement when a player has completed a level as the player may feel a sense of achievement for completing something more difficult.

Ice Blocker

In a typical implementation, these blockers contain other game elements. Having a match next to these blockers will break them and free the game elements inside them. While the game elements are trapped in the ice blocks, they can't be part of a combination. An exemplary implementation can be seen in FIG. 19.

The ice blocks are not fixed on the game board but fall down as the rest of the game elements when space is cleared underneath them. New ice blocks may also fall onto the game board when space has been cleared.

If a line blast element is being triggered and an ice block is within its area of effect, the ice block will also be removed together with the other game elements.

Clay Blocker

In some implementations, this blocker appears as a block of hardened clay. It may not have any game elements on top of it and its position is fixed on the game board, i.e. it does not fall down even if there is an empty space below it. Other game elements cannot fall through this blocker but the blocker may be removed. Having a match next to the blocker will either remove the blocker or remove one of its layers. In a typical implementation, the blocker has one or two layers and therefore needs one or two matches next to it to be removed. The blocker is not limited to only two layers and may be implemented to have more. An exemplary implementation can be seen in FIG. 19.

In some implementations, if a line blast element has been triggered and its area of effect goes through the blocker, then the blocker may be removed, together with the other game elements.

Rock Blocker

In a typical implementation, this blocker needs either one or two matches on top of it to disappear. When removed, the blocker will reveal the standard dirt block that needs to be removed in order to make a path between the entry and exit point(s). If the rock blocker is not removed then the path can not go through that way. In some implementation this blocker may have even more layers before it is removed. An exemplary implementation can be seen in FIG. 20.

If a line blast were to hit a rock blocker, then the rock blocker would have one layer removed and it would not block the effect of the line blast element.

Purple Blocker

In some implementations there are blocks which are simply there to take up space on the game board. No game elements can be placed on top of these blockers. The blockers can't be removed and they are also fixed on the game board, i.e. if game elements are cleared underneath the blockers they will not fall down to take their place. Instead game elements placed above the purple blockers will fall through the blockers and fill up the empty space. If a path has been made between an entry and exit point and there is a purple block in between, then the water (as it is in some implementations) will not flow through the blocker and therefore not reach the exit point. A path has to be made around the blocker. An exemplary implementation can be seen in FIG. 21.

If a line blast element is triggered and there is a purple blocker in its area of effect, then the blocker will not be removed but it will still let the effect of the line blast element go through it and remove the game elements on the other side of it.

Metallic Blocker

In a typical implementation, this blocker cannot be removed and is fixed into place on the game board. It does not let any game elements fall on top of it or through it. If a line blast element is triggered and it's within the line blast's area of effect, then it will hinder the effect to go through and no game elements behind the blocker will be removed, including the blocker itself. An exemplary implementation can be seen in FIG. 22.

Boosters

The game may be implemented to offer the player the opportunity to buy or to generate or in some other way acquire boosters to enhance the gameplay. The boosters can in some implementations match the obstacles introduced on the game board.

+5 Moves

In some implementations, there are boosters available before starting a level. One of these is a booster that gives the player five extra moves. This booster may also be available in other parts of the game as for example during the session of a level or perhaps when the player has run out of moves and is given an option to receive five more moves.

+15 Sec

In other implementations, when a level may be time based, there is a booster available before starting a level that gives the player 15 more seconds to play. This booster may also be available in other parts of the game as, for example during the session of a level or perhaps when time has run out and the player receives an option to continue 15 seconds more.

Show Treasures

If the player has trouble with earning enough points on a level or finding the correct items to finish a level, a booster that shows where these things are hidden on the game board may indeed be helpful. In some implementations, this booster can be chosen before starting a level as well as while playing a level. The booster could be implemented so that it only shows the hidden items for a short period of time, or during the whole session of a level or sub level.

Colour Bomb

Another booster that is available in a typical implementation is the colour bomb booster. It can be available before starting a level, which then lets the player start the game with a colour bomb randomly placed on the game board. It could also be implemented so that the booster is chosen during the play of a level and the colour bomb could either randomly be placed on the game board or the player could choose where to place it.

Social Aspect
Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a path, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API. It allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, have a limited number of levels and no external social network connection. In some implementations players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 23:
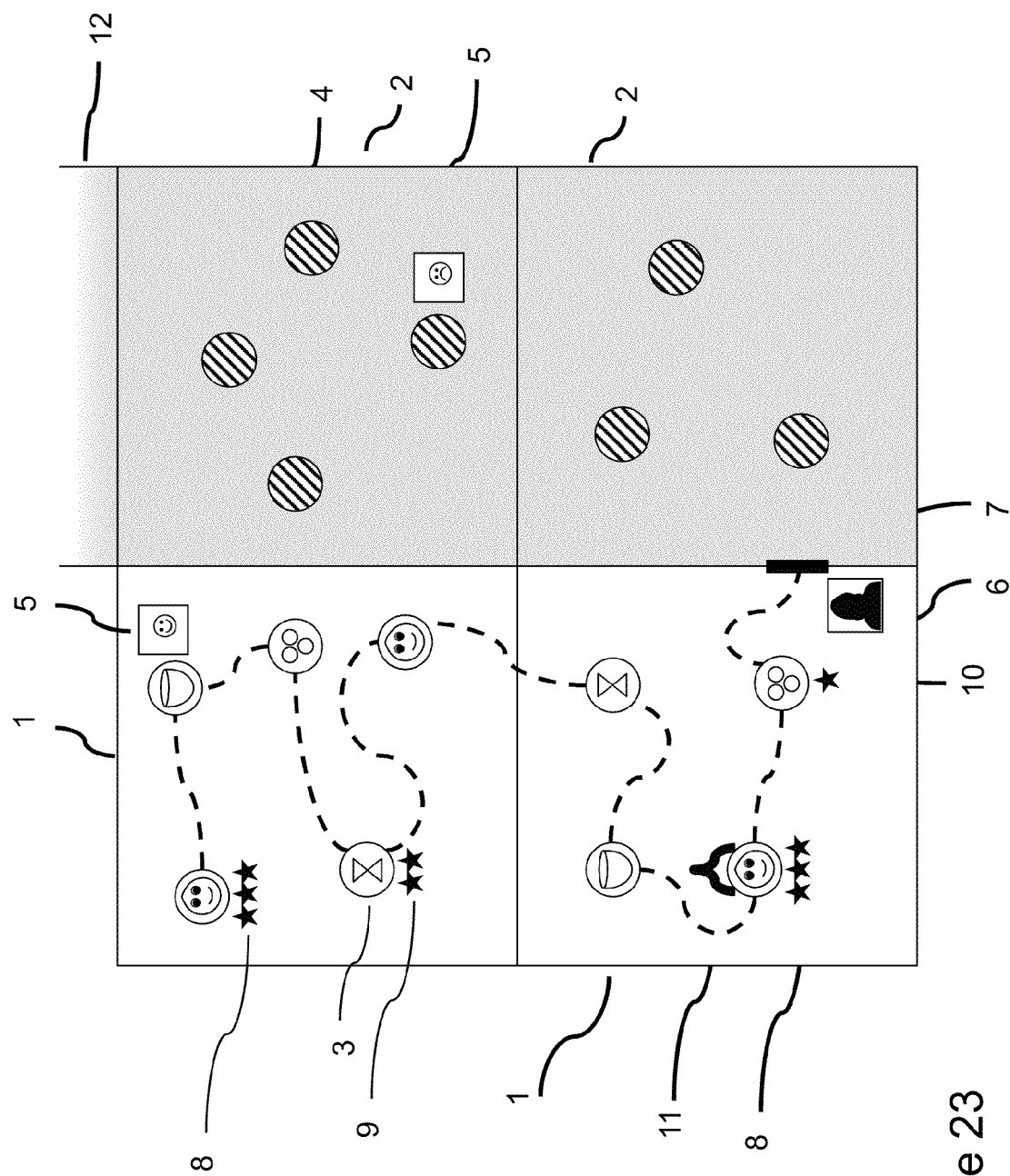
FIG. 23 shows a virtual map.

The game can be implemented so that a player progresses through multiple levels of changing and typically increasing difficulty. FIG. 23 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, as well as opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated in the first levels of the game, but they can also be used at later stages to explain newly introduced elements and objects.

The levels can be numbered consecutively throughout the game or they can be numbered within a stage. It is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels, or on the number of friends that the player has invited to play the game.

In one implementation, one challenge 7 to unlock a stage arises when traveling from one stage to another, once all the levels have been completed in that stage. The levels in the stage to which the player is travelling are typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

If a player does not have an Internet connection and is unable to ask friends for help through a social network as well as being unable to pay to unlock the next stage, then there is another alternative to unlock a locked stage. In a typical implementation this is an offline alternative called 'Mystery Quests' but it may also be available in an online setting. Mystery quests give players the option of completing one or several challenges in order to unlock a stage. Such challenges can for instance be to replay previously played levels with or without modified level goals. In some implementations three challenges need to be completed in order to pass a locked stage. It is also possible to combine the ways of accessing a locked stage. For instance, completing one Mystery quest could make it so that the player only has to request help from two friends once a connection to a social network has been established, or that the player does not need to pay as much for purchasing the unlocking of a stage.

The request for help is sent to the friend who then has the option to accept to help. The request for help can in some implementations be sent using the social network to which the game is connected; an alternative implementation is to send the request to someone external to the game (via email, text message, or instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 23, there can also be other levels, or stages that are not part of the progress along the path in the virtual map. Such stages or levels can be present in the game associated with the virtual map at all times, or can be unlocked when the user reaches a certain in-game achievement. This in-game achievement can for instance be completing a specific level, reaching a predetermined high score (for instance, collecting a specific number of stars when completing a level —highly skilled gameplay can win the user three stars) or paying virtual currency to unlock the stage or level.

The map layout in FIG. 23 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographical area as the player. The user has the option to choose from other people; not being friends on the social network, but that meet other certain criteria.

The user can play any of the unlocked levels on the map, so that the user can go back and replay already completed levels to get a better score or beat friends' high scores, or to receive other rewards that may come from certain levels when for example earning a certain amount of points or stars.

The player is in some implementations of the game rewarded for good gameplay of a level, for instance reaching a target score or completing the level in a short time. In some implementations, the user has to reach a certain number of points to complete a level, reaching this target score can be represented with a symbol such as a star. In one implementation a star is lit when the user reaches a certain number of points in a level.

The user can earn more than one star on each level and the levels are re-playable to get a higher score. In some implementations the indicators representing the players' performance can be related to other goals, such as completing levels within a certain amount of tries.

The player's total number of stars collected in the game can, in some embodiments, unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who, among the user's connections, or among a subset of the user's connections has the highest score. There can in some embodiments be a notification 11 shown on the map if the user that has the highest score among the friends connected to the game. Such a notification can be in the form of a message sent through, for instance, the social network or an in-game message.

The type of game mode or game goals for a level can be displayed on the map as a symbol; for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences, which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 24:
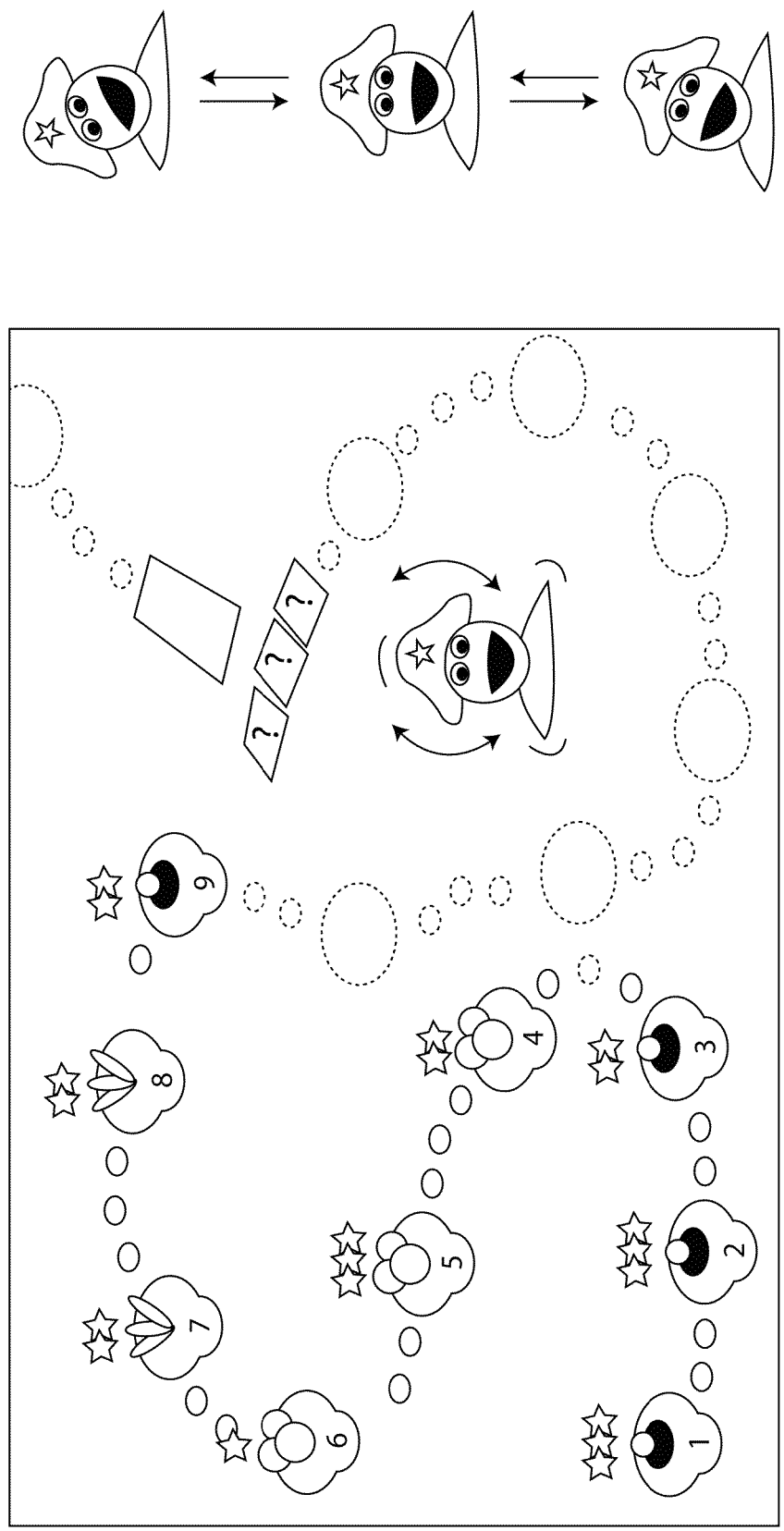
FIG. 24 shows an example of an animation on a virtual map.

One example of how the virtual map can be dynamic and moving is shown in FIG. 24. Different objects on the map change their appearance slightly or a lot over time. In the example of FIG. 24 a coconut character wiggles back and forth.

Pre- and Post-Level Screens

Before starting a level, players have to select which level to play from the map view. When selecting a level, the player is shown information about the level, such as the amount of points needed, the available boosters that can be used, the goal of the level and also the high scores of friends who have previously played that level.

Figure 25:
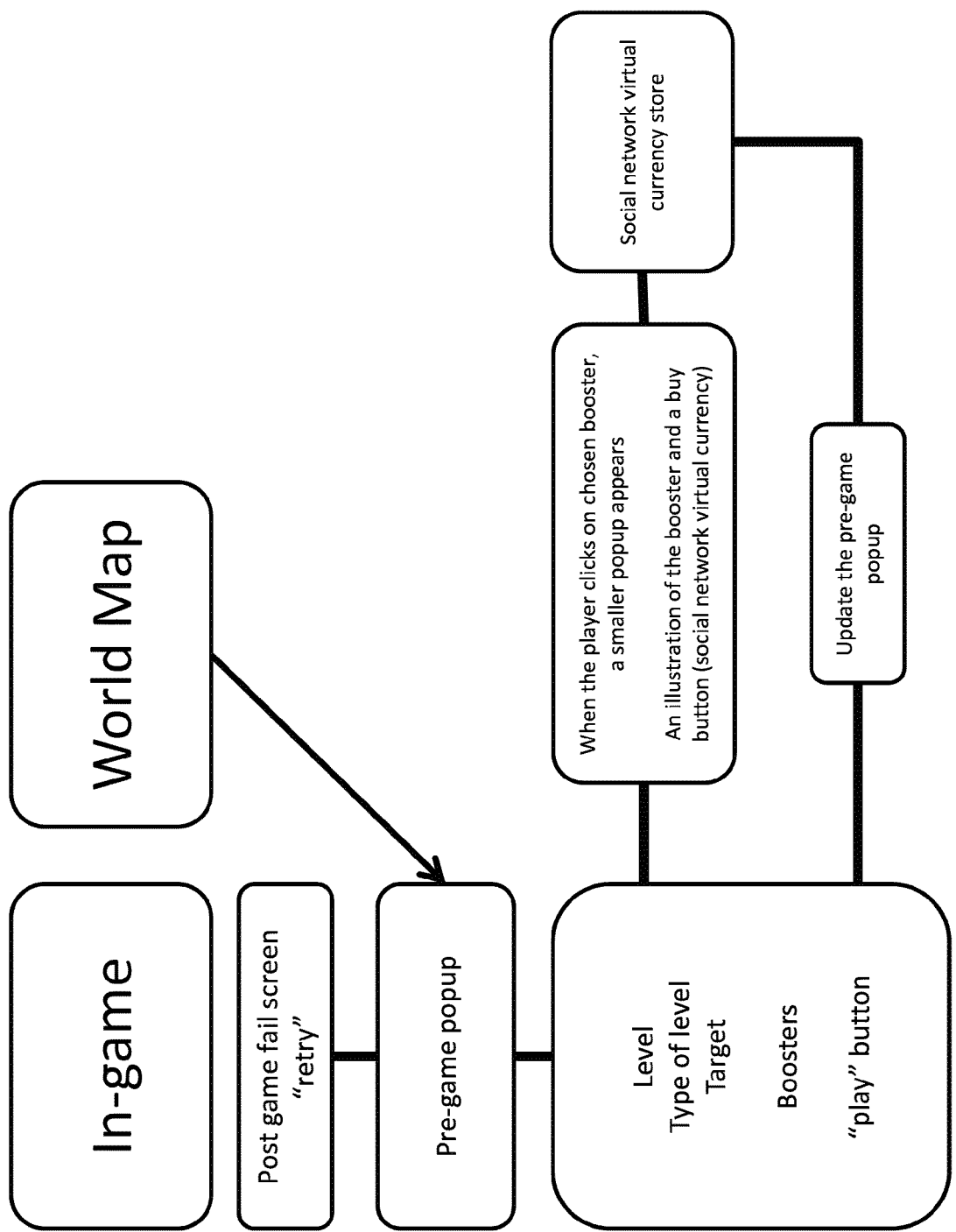
FIG. 25 shows a pre-level game progression.

FIG. 25 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 26:
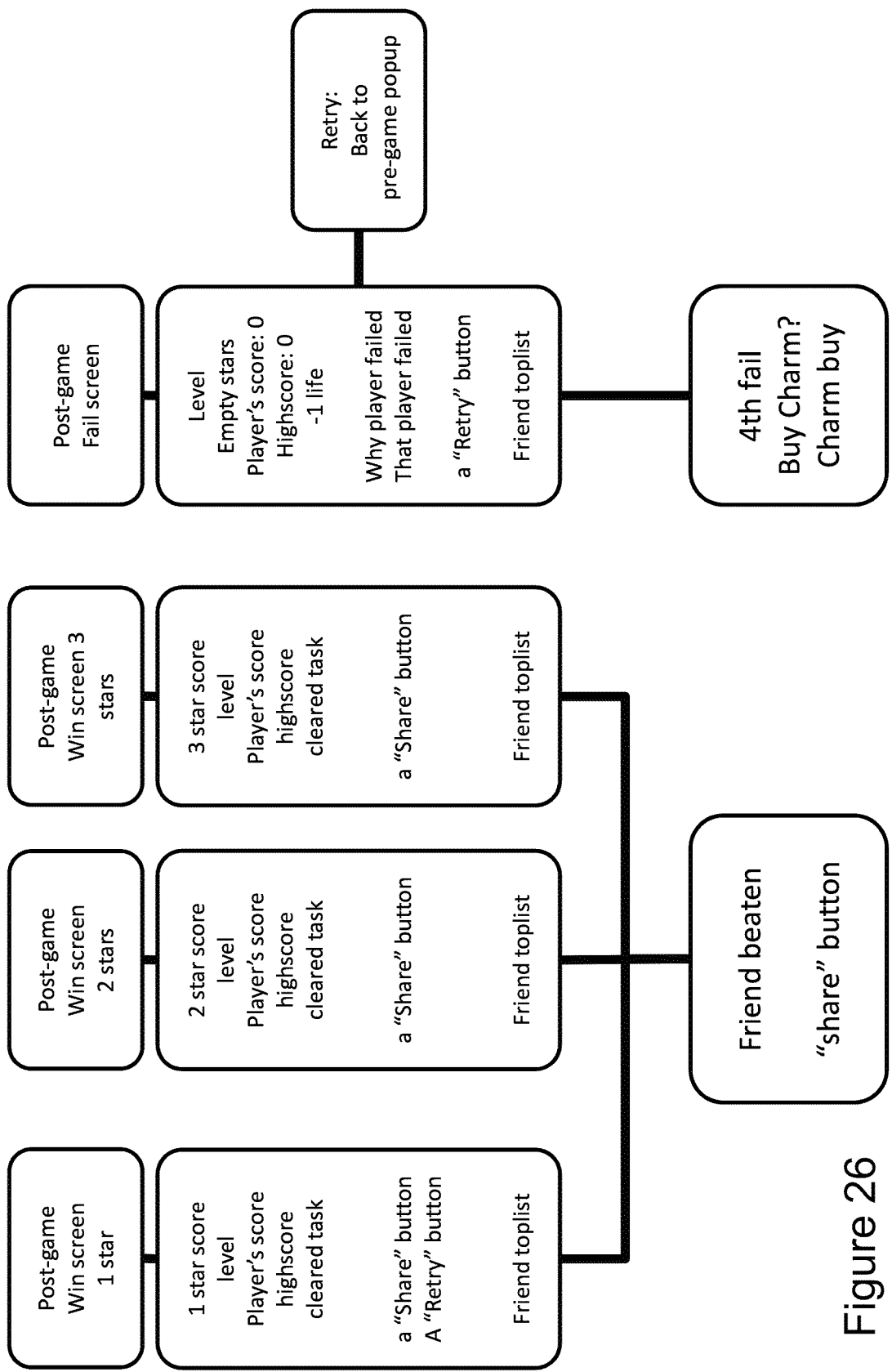
FIG. 26 shows a post-level game progression.

After completing a level, the player is presented with a screen that shows the amount of points gained, the amount of stars achieved and also the previous high scores of friends. One implementation of the game flow related to the post-level screen is shown in FIG. 26.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' high scores, together with a message about which friend(s) that have been beaten.

High Score List

When showing the pre-level screen, players are presented with the high scores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' High Scores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 27:
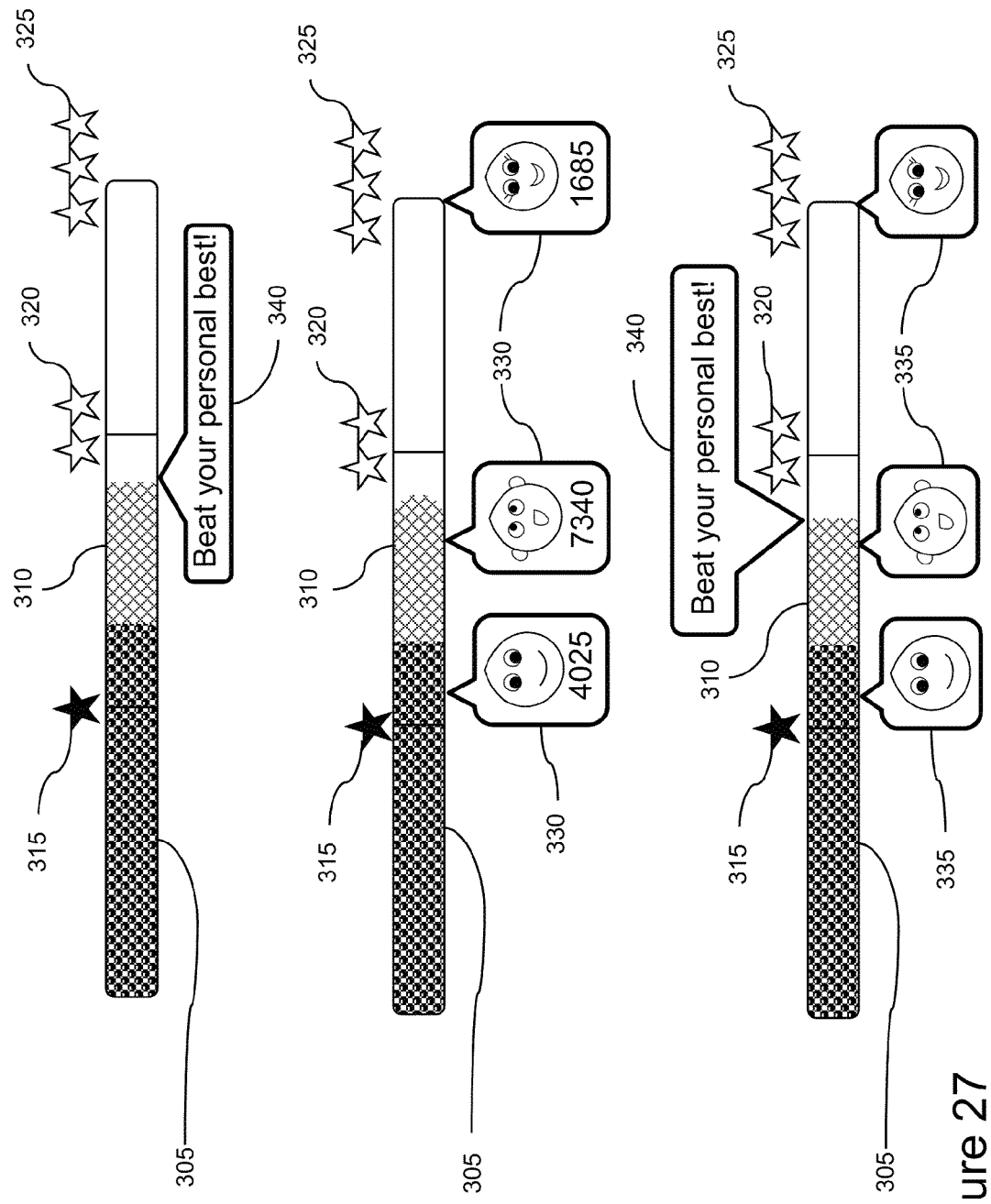
FIG. 27 shows different ways of implementing a score meter and the results of other players.

In some implementations, the player can see indications of the previous high score achieved on a level while playing it, shown by 310 in FIG. 27. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 27. When the player passes the score of another player or the previous best score the player is achieved, a message can be shown to encourage the player and denote the accomplishment. One example of such a message is illustrated by 340 in FIG. 27.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based on data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 28:
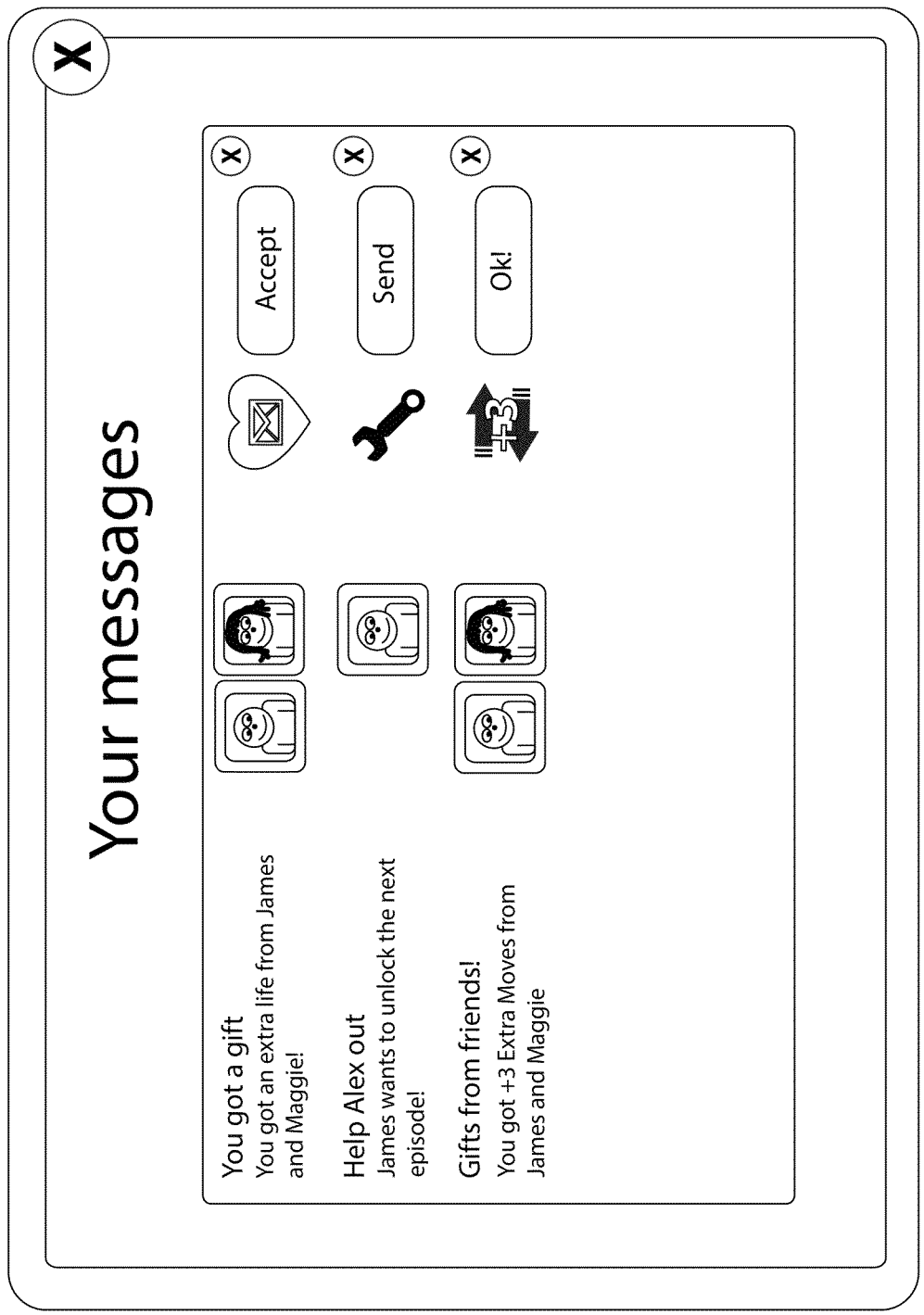
FIG. 28 shows an implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 28 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics to lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 29:
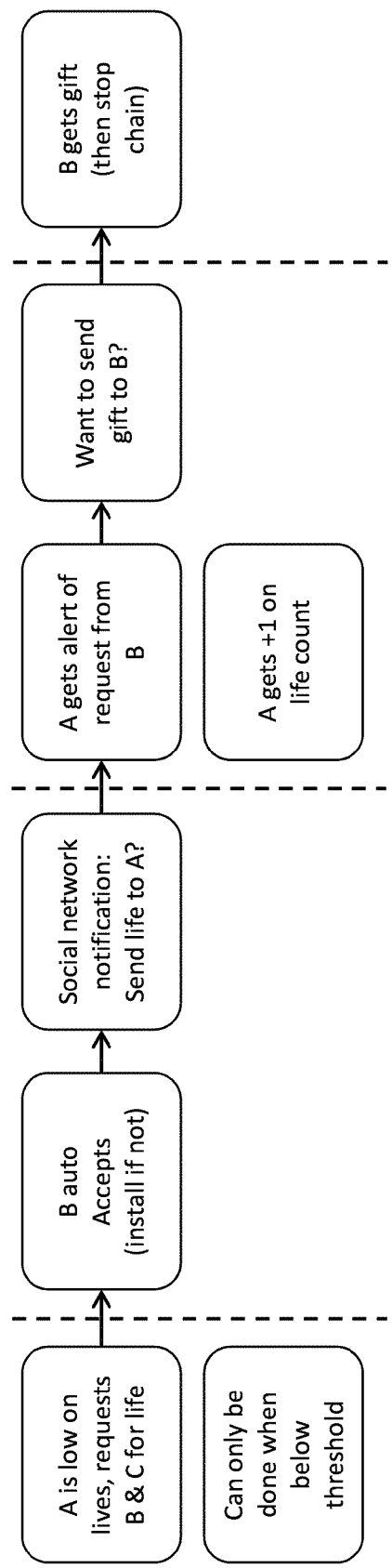
FIG. 29 shows an implementation of the chain of events when requesting and sending lives.

In the mobile version of the game, the player is presented with messages when logging in. Messages that are presented can be related to the player receiving lives and friends requesting lives. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts by requesting a life, the chain of events has three steps; step 1 is requesting a life, step 2 is receiving a life, step 3 is sending a life or a thank-you message back in response. One implementation of this chain of events is illustrated in FIG. 29.

It is also possible to buy gifts in the in-game shop and send these to friends. Such gifts are in the form of boosters that can be used either during a level or before a level.

Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 30:
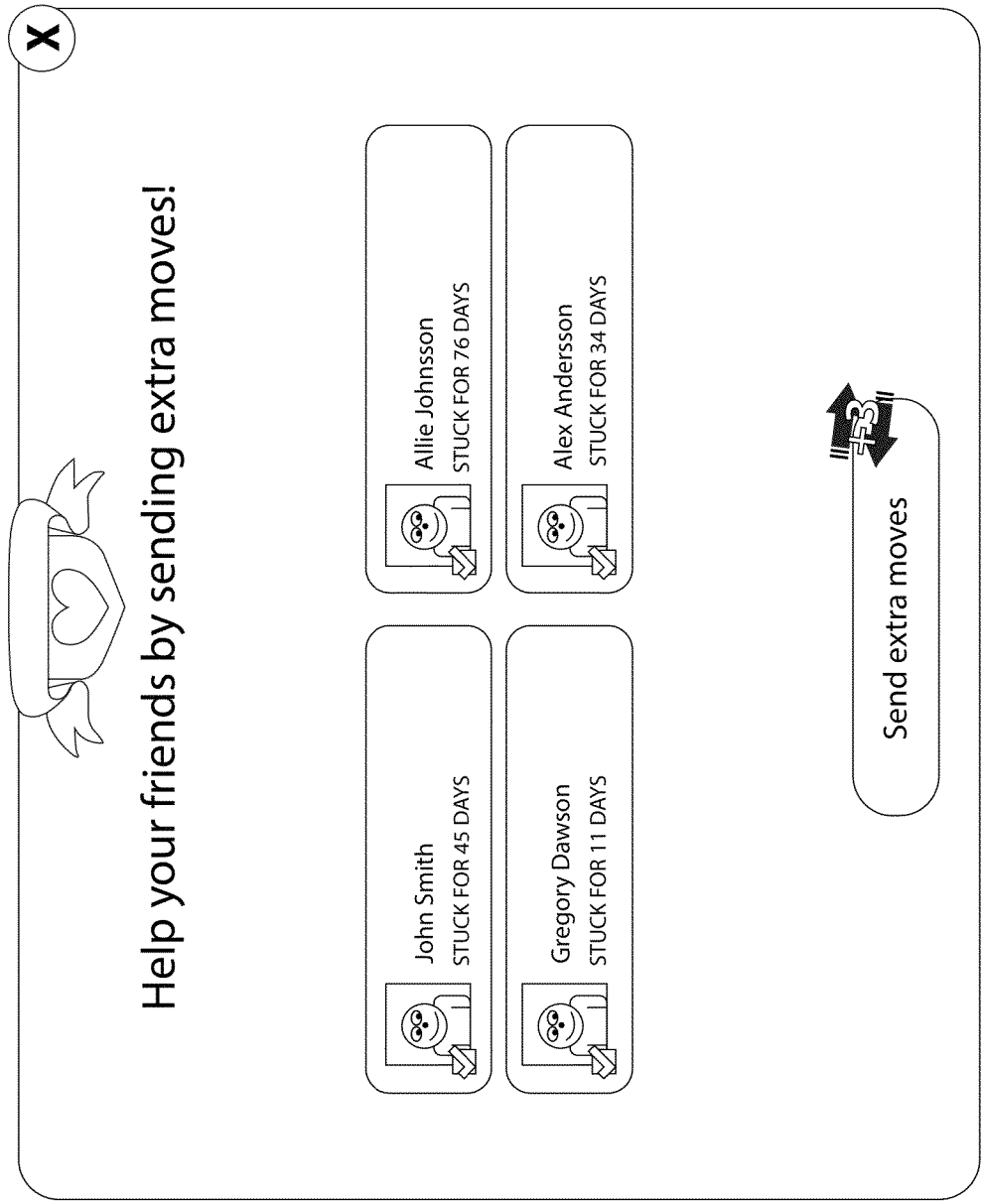
FIG. 30 shows a screen prompting the player to help friends that have been stuck for an extended period of time.

The prompting from the game can happen at different points in the game, for instance when a player logs onto the game. Such prompting is illustrated in FIG. 30. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above, about a thank-you message related to sending lives.

Head to Head Tournaments

The game can also be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and In-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, e.g. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that are active on a computer-based platform could get a bonus for also installing the game on a handheld device. Such bonus may for instance be in the form of in-game currency, a booster to be used in the game, or other in-game valuable object.

Players can also be rewarded for playing multiple games that are, for instance, related games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active. Some implementations may also have levels within the game which are designed specifically for certain physical locations; for example if visiting a Starbucks coffee shop there may be a level only accessible when visiting one of their premises. There may be another level designed for when visiting a certain city, airport, train and a variety of other places.

If trying to access the game online, as opposed to starting a local version that is saved on the device, while updates are being made, the player can be met by a message saying that the game cannot be accessed right at that moment.

The invention claimed is:

1. A computer implemented method, in which a computing device comprises one or more processors, a display configured to display computer game graphics for a computer game, and an input device, said input device comprising a touch screen or a cursor based input device, and in which the one or more processors are programmed to execute computer code to perform the steps of:

controlling the display to display computer game graphics of a gameboard with multiple game elements that disappear when matched, where the gameboard includes an entry point and two or more exit points; and wherein the multiple game elements are a set of interactive game objects and are configured to be matched in response to a user input provided via said input device;

determining, in response to user input provided via said input device, that a player has made a path from the entry point to one of said exit points by matching a number of said game objects, thereby completing a level of the game;

controlling the display so as to show a virtual path through which the player progresses if he or she completes a level of the game, wherein the virtual path has at least one node that forks in two or more different directions; and updating the display so as to show a selected direction of the fork in the virtual path, wherein said direction is dependent on the position of the exit point that the player successfully reached in the gameboard to complete the level.

2. The method of claim 1 in which the processor shows the virtual path as passing through underground tunnels and rooms.

3. The method of claim 2 in which the processor shows an animated figure digging though the underground tunnels to reach or construct new rooms.

4. The method of claim 1 in which the processor shows the gameboard, if a path is cleared of elements to an exit, with water flowing from the entry position to the exit.

5. The method of claim 1 in which the processor shows the gameboard elements as diamonds, jewels or candies.

6. The method of claim 1 in which the processor is programmed so that each level has to be cleared in a defined number of moves, but is not timed.

7. The method of claim 1 in which the processor is programmed so that each gameboard has between 1 and 3 exits.

8. The method of claim 1 in which the game is a casual, social game and some or all levels have a true fail, to enable monetization through purchasing extra moves.

9. The method of claim 1 in which a continuous musical soundtrack plays during gameplay.

10. The method of claim 1 in which the game generates and displays congratulatory messages when the player scores more than a predefined amount, or matches more than a predefined number of game elements, in a single move.

11. The method of claim 1 in which there is an algorithm for automatically detecting when there are no possible moves left.

12. The method of claim 1 in which there is an algorithm for re-shuffling the elements on the game board.

13. The method of claim 1 in which a processor generates, if no move has been made for a while, help or hints by brightening and enlarging game elements used in a possible move on the board with a flashing animation that occurs once, or repeats twice or thrice.

14. The method of claim 1 in which a processor is programmed to require a player to reach a target score before running out of moves in order to complete a level successfully, but completing the level is not timed.

15. The method of claim 1 in which a processor is programmed to automatically replenish a life for a player in 30 minutes.

16. The method of claim 1 in which a processor is programmed so that, if a player finishes a level in under the target number of moves, then random game elements on the game board are triggered and give the player bonus points.

17. The method of claim 1 in which a processor is programmed so that, if a level is finished with moves left, those moves are converted to special game elements that trigger for extra bonus points.

18. The method of claim 1 in which a processor is programmed so that the game generates and displays congratulatory messages when the player scores more than a predefined amount, or matches more than a predefined number of game elements, in a single move.

19. The method of claim 1 in which a processor is programmed so that the player can ask his friends for lives or other help.

20. The method of claim 1 in which social network friends are prompted to assist another player if that other player has played, but not completed, a level meeting a certain criteria.

21. The method of claim 1 in which a processor is programmed so that the player can send gifts to friends.

22. The method of claim 1 in which a processor is programmed so that the game can be synchronized between different devices.

23. The method of claim 1 in which a processor is programmed so that a player can seamlessly stop and re-start playing the game at any time since game state information is stored, remotely and/or on the playing device.

24. The method of claim 1 in which every move of a game piece by the user, and every consequential change in every game piece on the game board, is accompanied by sound and visual feedback to provide immediate, positive gratification to the player.

25. The method of claim 1 in which game state information is preserved, enabling a remote server system to identify a player and all aspects of the state of the game they are playing, so that the player can end game play on one device and resume from a different device at a later time at exactly the same state.

26. The method of claim 1 in which the different device can be a different type of device, so that the player can move seamlessly between playing the game on a smartphone and on a tablet.

27. The method of claim 1 in which a remote server system can identify a player because that player has accessed the game through a social network.

28. The method of claim 1 in which the processor is programmed to show a virtual path or other virtual world that indicates the level reached by the player and that player's social network friends.

29. The method of claim 1 in which the game is a casual, social game, namely a game that can be downloaded as an app to at least one of a smartphone and tablet computer and which can be accessed or played using a social network application or environment.

30. A computing device adapted to play a computer game, the device including a processor, a memory, a display, an input device, said input device comprising a touch screen or a cursor based input device, and computer code stored in device memory or on a remote server and executable by the device processor or a remote processor, and in which said one or more processors execute said computer code to perform the steps of:
controlling the display to display a computer game graphics of a gameboard with multiple game elements that disappear when matched, where the gameboard includes an entry point and two or more exit points;
wherein the multiple game elements are a set of interactive game objects and are configured to be matched in response to a user input provided via said input device;
determining, in response to user input provided via said input device, that a player has made a path from the entry point to one of said exit points by matching a number of said game objects, thereby completing a level of the game; controlling the display so as to show a virtual path through which the player progresses if he or she completes a level of the game,
wherein the virtual path has at least one node that forks in two or more different directions; and
updating the display so as to show a selected direction of the form in the virtual path, wherein said direction is dependent on the position of the exit point that the player successfully reached in the gameboard to complete the level.

31. A non-transitory computer readable medium encoded with instructions which when executed by a processor perform a method for controlling a computer system to display a game board and a virtual path on a display, said method comprising:
- controlling the display to display computer game graphics of a gameboard with multiple game elements that disappear when matched, where the gameboard includes an entry point and two or more exit points;
- wherein the multiple game elements are a set of interactive game objects and are configured to be matched in response to a user input provided via an input device, said input device comprising a touch screen or a cursor based input device;
- determining, in response to user input provided via said input device, that a player has made a path from the entry point to one of said exit points by matching a number of said game objects, thereby completing a level of the game,
- wherein the virtual path has at least one node that forks in two or more different directions; and
- updating the display to as to show a selected direction of the fork in the virtual path, wherein said direction is dependent on the position of the exit point that the player successfully reached in the gameboard to complete the level.

* * * * *